US008261342B2

(12) United States Patent
Newman

(10) Patent No.: US 8,261,342 B2
(45) Date of Patent: Sep. 4, 2012

(54) PAYMENT CARD INDUSTRY (PCI) COMPLIANT ARCHITECTURE AND ASSOCIATED METHODOLOGY OF MANAGING A SERVICE INFRASTRUCTURE

(75) Inventor: Richard Newman, Brooklyn, NY (US)

(73) Assignee: Reliant Security, New York, NY (US)

( * ) Notice: Subject to any disclaimer, the term of this patent is extended or adjusted under 35 U.S.C. 154(b) by 422 days.

(21) Appl. No.: 12/543,860

(22) Filed: Aug. 19, 2009

(65) Prior Publication Data

US 2010/0050249 A1   Feb. 25, 2010

Related U.S. Application Data

(60) Provisional application No. 61/090,451, filed on Aug. 20, 2008.

(51) Int. Cl.
*H04L 29/06* (2006.01)
(52) U.S. Cl. .................. 726/15; 709/224; 726/1; 705/64
(58) Field of Classification Search ............ 726/15, 726/1; 709/224; 705/64
See application file for complete search history.

(56) References Cited

U.S. PATENT DOCUMENTS

| | | | |
|---|---|---|---|
| 6,851,061 B1 * | 2/2005 | Holland et al. ............... 726/23 |
| 2007/0124803 A1 * | 5/2007 | Taraz ............................. 726/4 |
| 2007/0262139 A1 * | 11/2007 | Fiebiger et al. ............. 235/380 |
| 2008/0098230 A1 * | 4/2008 | Kalibjian et al. ............. 713/176 |
| 2008/0140441 A1 * | 6/2008 | Warner ............................ 705/1 |
| 2008/0140442 A1 * | 6/2008 | Warner ............................ 705/1 |

OTHER PUBLICATIONS

Espacenet search, Espacenet Result List, Oct. 2011.*
fips 186-2, Digital Signature Standard DSS, Jan. 2000.*
Cheong et al, Efficient and Secure Card-based Payment System Based on ANSI X9.59-2006.*
Chi Po et al, On Designing an Efficient and Secure Card-based Payment System Based on ANSI X5.59-2006, 2007.*
Levi et al, CONSEPP: CONvenient and Secure Electronic Payment Protocol Based on X9.59, Dec. 2001.*

* cited by examiner

*Primary Examiner* — Jung Kim
*Assistant Examiner* — Shan Elahi
(74) *Attorney, Agent, or Firm* — Oblon, Spivak, McClelland, Maier & Neustadt, L.L.P.

(57) ABSTRACT

A system to ensure compliance with data security standards for merchants that store, process, and transmit secure data, includes a security appliance having a global unit to monitor the functions of the security appliance, a logging unit to log data from network devices at the merchant's site and from other security appliance units, an integrity unit to construct maps of file systems of the network devices and to compare the constructed maps with previously constructed maps to detect differences between them, and a scanning unit to periodically scan the network to detect unrecognized devices on the network. The system further includes a display unit to provide compliance information on a secure basis, a back-end unit to automate and manage compliance-related tasks and data security events, and a control unit to monitor compliance performance in real-time and to implement required procedures to ensure compliance with data security standards.

18 Claims, 23 Drawing Sheets

| Encrypt transmission of cardholder data and sensitive information across public networks | Use and regularly update anti-virus software | Develop and maintain secure system and applications |
|---|---|---|
| *1* | *4* | *5* *6* |
| Restrict access to data by business need-to-know | Assign a unique ID to each person with computer acess | Maintain a policy that address information security |
| *7* | *8* | *9* |
| Restrict physical access to cardholder data | Track and monitor all access to network resource and cardholder data | Regularly test security system and processes |
| *10* | *11* | *12* |

Stroe Status

Select one store ▼

Stroe Status

| Store | Date | Summary |
|---|---|---|
| Irvin, CA | 3/5/06 0:51 | TCP Port Scan |
| Corpues Christi, TX | 3/10/06 0:51 | SSH Brute Force |
| Andover, MA | 3/21/06 0:51 | Unauthorized IP |

*Fig. 12B*

| RELIANT SOLUTIONS 702 | PCI COMPLIANCE PORTAL | | | User: User1 LOG OUT |
|---|---|---|---|---|
| Home | Store Systems 708 | Tickets 706 | Change Management | Logs | Policies and Procedures 705 |

Network Status

Host System Status | Virtualized Device Status
① Connectivity | ① Perimeter Security
② System Status | ② Detection
③ Configuration | ③ Logging

System Documentation Updates

| Description | Date |
|---|---|
| Dino's Top Level Infosec Policy | 2007-05-15 14:06:22 |
| Network and Systems Hardening Standards | 2007-05-15 14:05:40 |
| System Development Lifecycle | 2007-05-15 14:02:55 |
| MPS DB Scheme | 2007-05-14 14:00:27 |
| PCI Portal Tech Spec | 2007-05-08 15:19:59 |

Other Recent Documents

Open Tickets

My Open Tickets

| Ticket | Store | Description | Date |
|---|---|---|---|
| 169 | 102 | Unauthorized C.. | 2007-05-11 14:48:00 |

More open tickets »

System Alerts

| Ticket | Store | Description | Date |
|---|---|---|---|
| 169 | 102 | Unauthorized C.. | 2007-05-11 14:48:00 |
| 168 | 101 | Redbox connect.. | 2007-05-11 14:44:11 |

More open tickets »

Scheduled Events for May 2007

| Ticket | Store | Change Date | Date | | Date |
|---|---|---|---|---|---|
| 176 | 108 | 05/10/2007 | Add new user (.. | | 2007-05-11 15:27:29 |
| 175 | 104 | 05/21/2007 | POS config cha.. | | 2007-05-11 15:02:42 |

More open tickets »

*Fig. 13*

| Size (bytes) | Date | Filename | Log Analysis Complete | Checked by | Checked at | Comments |
|---|---|---|---|---|---|---|
| 6297 | 04/05/2006 13:10:33 | 45:56:65.259-20060405l 255-log-gz | NO | N.A. | N.A. | |
| 4562 | 04/05/2006 12:05:33 | 45:56:65.259-20060405l 255-log-gz | YES | Newman | 4/5/06 11:15 | |
| 4562 | 04/05/2006 09:20:10 | 45:56:65.259-20060405l 255-log-gz | YES | Newman | 3/5/06 12:20 | No anomalies found |
| 4562 | 04/05/2006 08:10:20 | 45:56:65.259-20060405l 255-log-gz | YES | Newman | 3/5/06 10:15 | No anomalies found |
| 4562 | 04/05/2006 16:15:01 | 45:56:65.259-20060405l 255-log-gz | YES | Newman | 3/5/06 15:02 | |

*Fig. 15A*

PAYMENT CARD INDUSTRY (PCI) COMPLIANT ARCHITECTURE AND ASSOCIATED METHODOLOGY OF MANAGING A SERVICE INFRASTRUCTURE

CROSS-REFERENCE TO RELATED APPLICATIONS

This application claims the benefit of U.S. Provisional Patent application Ser. No. 61/090,451, entitled PCI Compliant Architecture and Associated Methodology of Managing a Service Infrastructure, which was filed Aug. 20, 2008. The entirety of the aforementioned application is herein incorporated by reference.

BACKGROUND

Faced with mounting liability, rapidly escalating damage to consumers, and erosion of customer confidence in electronic payment systems, the Payment Card Industry ("PCI") has developed a Data Security Standard (DSS) for businesses that store, process and/or transmit credit card data. Compliance requirements have been increasingly enforced and critical failures in maintaining compliance with the PCI DSS have resulted in significant penalties for both the processors and the merchants. Compliance with the PCI security standards is not optional for merchants that store, process and/or transmit sensitive credit card data. However, many merchants have found that achieving compliance with the PCI DSS in a distributed store environment to be complex and expensive.

As a result, credit card brands began focusing on the store system environment and point-of-sale ("POS") systems as the entry point for most malicious attacks. These environments are vulnerable due to their remote locations, weakly defended networks, lack of local technical staff and often antiquated POS systems. Visa, the largest of the credit card associations, has recently focused on the store systems threat. Over 70% of the Data Security Alerts released on Visa's website from September 2006 to April 2009 address store systems vulnerabilities. Unfortunately, the introduction of PCI in the retail sector has been disruptive and meeting PCI requirements at the store systems level has proven challenging.

While individual stores may not represent a significant portion of a retailer's overall investment in Information Technology (IT) systems, the amount of credit card data processed there represents risk to both the merchant and the card association members. Some stores process fewer than 500 transactions per day but still qualify as the primary source of card processing risk for the merchant. Accordingly, the PCI data security requirements at the store environment may require a disproportionably high level investment in technical and physical controls when compared to existing measures of IT investment. However, such investment has become more appropriate due to the increased nature of the data risk and associated liability.

Traditional data security solutions for store environments typically require a "mini-data center" approach which involves multiple security devices and applications integrated in customized configurations. These security devices are expensive to deploy and difficult to manage in a widely distributed environment. Most stores do not maintain the skills to manage the operation of the devices and have little or no capability to prove effective ongoing operations required to meet audit requirements under the PCI standards.

The traditional approach for meeting the PCI standards will require both a large upfront capital and deployment cost, along with a large "total cost of ownership" associated with ongoing maintenance and operation of the solution. Moreover, reliability issues, which threaten retailers' ability to accept credit card transactions, are a significant concern at the store systems level. Most retailers can ill afford the time normally required to work out compatibility and configuration issues normally associated with integration efforts of custom systems.

As such, there is a need in the art for a cost effective system that protects cardholder data by protecting the devices that contain cardholder data, and a further need for devices and systems that can detect non-compliance with payment card industry standards.

SUMMARY

In an exemplary embodiment of the invention, the system to ensure compliance with data security standards for merchants that store, process, and transmit secure data includes a security appliance located at a merchant's site to perform multiple security functions, the security appliance including a global unit to monitor the functions of the security appliance and other units of the security appliance, a logging unit to log data from all network devices at the merchant's site and from other units of the security appliance, an integrity unit to construct maps of file systems of the network devices and to compare the constructed maps with previously constructed maps to detect differences between the constructed maps and the previously constructed maps, and a scanning unit to perform periodic network scans to ensure security of the network devices and to detect unrecognized devices on the network. The system further includes a display unit to provide information of compliance performance of the system on a secure basis, a back-end unit to automate and manage compliance-related tasks and data security events and to ensure integrity of the network devices, and a control unit to monitor compliance performance in real-time and to implement additional procedures required based on the monitored compliance to ensure compliance with data security standards.

In another exemplary embodiment of the invention, a security appliance to perform multiple security functions includes a global unit to monitor the functions of the security appliance and other units of the security appliance, a logging unit to log data from all network devices at the merchant's site and from other units of the security appliance, an integrity unit to construct maps of file systems of the network devices and to compare the constructed maps with previously constructed maps to detect differences between the constructed maps and the previously constructed maps, and a scanning unit to perform periodic network scans to ensure security of the network devices and to detect unrecognized devices on the network.

In another exemplary embodiment of the invention, a method to be performed by a system to ensure compliance with data security standards for merchants that store, process, and transmit secure data includes performing multiple security functions. These security functions include monitoring functions of the security appliance and of other units of the security appliance, logging data from all network devices at the merchant's site and from other units of the security appliance, constructing maps of file systems of the network devices and comparing the constructed maps with previously constructed maps to detect differences between the constructed maps and the previously constructed maps, and performing periodic network scans to ensure security of the network devices and to detect unrecognized devices on the network. The method further includes displaying information of compliance performance of the system on a secure basis, automating and managing compliance-related tasks and data security events, and ensuring integrity of the network devices, and monitoring compliance performance in real-time and implementing additional procedures required based on the monitored performance to ensure compliance with data security standards.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 12A-B are screen shots of an exemplary portal according to an embodiment of the invention;

FIG. 13 is a further screen shot of an exemplary portal according to an embodiment of the invention;

FIGS. 15A-B are exemplary portal screen shots, depicting payment card industry network appliance logs according to an embodiment of the invention;

DETAILED DESCRIPTION

The Managed PCI System (MPS) according to an exemplary embodiment leverages virtualization, task automation and secure reporting to meet compliance requirements at a dramatically reduced price point. The system includes three primary components: a low-cost virtualized security appliance, a security portal, and a back-end system.

The low-cost virtualized security appliance, called Redbox, resides at the point of sale in the retail stores and performs multiple security functions including network segmentation, routing, firewalling, intrusion detection, log file aggregation, system file integrity monitoring and wireless access point detection. To meet intense cost pressure that retailers face, the appliance heavily leverages open-source software and is based on inexpensive commercial hardware. The Redbox is physically compact. The deployed Redboxes are managed centrally from the security portal of the MPS for handling configuration, authentication, integrity and status monitoring of the deployed Redboxes.

The security portal, called PCI Compliance Portal, provides retail IT managers and compliance auditors with a view into performance against compliance requirements at the store systems level. The portal allows authorized users to view and manage PCI controls across the enterprise.

The back-end system, called Back-End PCI Compliance Infrastructure, is provided to securely automate and manage many compliance-related tasks and data security events. This infrastructure automatically polls stores for security logs and creates incidents where further investigation is required. Additionally, the Back-End PCI Compliance Infrastructure automates tasks that ensure the integrity of controls deployed at the stores including virtualized device operating status and configuration.

Services are also provided to implement MPS in stores and to assist with compliance remediation in centralized areas of the retail enterprise including corporate headquarters locations.

Figure 1:
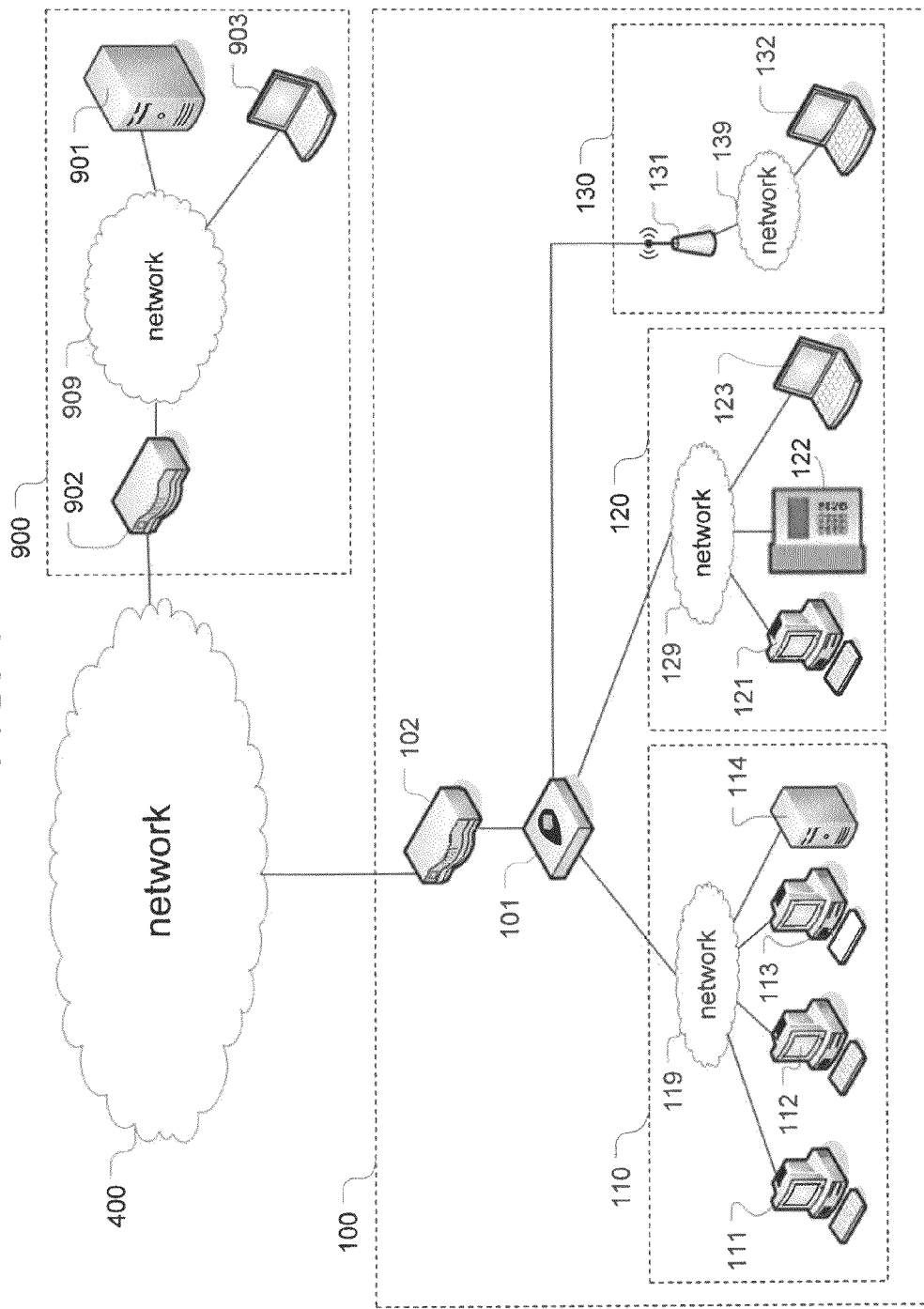
FIG. 1 is a network diagram including an exemplary architecture of an embodiment of the invention.

FIG. 1 is a network diagram of an exemplary architecture including a payment card industry network appliance (Redbox) 101. The Redbox is a virtualized security appliance that resides in a retail store 100 and operates a set of extended and integrated security applications. The Redbox 101 may run on any of a variety of hardware platforms. For example, The Redbox 101 may be run on an MPS APPLIANCE™ from Reliant Security of New York, N.Y.

As outlined above, the Managed PCI System (MPS) replaces many expensive security devices with a single integrated and remotely manageable solution. Each Redbox is a Swiss Army knife for the retail store system's security, providing at least the critical controls such as Network Segmentation, Firewall Protection, Role-Based Access Control, VPN Services, Intrusion Detection Services (IDS), Log Collection, Rogue Wireless Detection, Point-Of-Sale System Integrity and Vulnerability Management.

Network Segmentation

MPS enables retail merchants to isolate systems that collect, process, store and transmit cardholder data into zones 110 called Cardholder Data Environments ("CDEs") that include, for example, Point-Of-Sale (POS) systems. For illustrative purposes, a CDE is an area of the network that stores, processes, and/or transmits sensitive cardholder data. CDEs may be isolated from other areas of the network that do not store, process, and/or transmit sensitive cardholder data, for example, areas containing wireless access points, back-office systems, and areas controlling email and IP telephony to keep these systems out of the scope of PCI compliance. The MPS allows separating non-secure network zones 120, 130 for all other retail store systems including time and attendance management, VOIP, inventory management, receiving, CRM, and wireless. In effect, this approach moves systems that do not require PCI compliance out of scope. This approach is consistently found to minimize the cost of PCI compliance by limiting the operational overhead to only those systems for which it is required.

The Redbox 101 is configured to recognize the above mentioned zones 110, 120, 130 in a retail store 100 as being cardholder data zones or non-card holder data zones. For example, the Redbox 101 is configured to recognize zone 110 as a cardholder data zone that collects, processes, stores and transmits cardholder data, and to recognize zones 120 and 130 as non-card holder data zones that do not store, process, and/or transmit card holder data.

Cardholder data zone 110, as illustrated, includes several devices including point-of-sale terminals such as cash registers 111, 112, 113, which may each store cardholder data in an electronic memory. The cardholder data may comprise data read from the magnetic strip of a credit card, data obtained from a third-party (such as data obtained from a credit processor), or data stored in a corporate memory (database or file system) such as a cardholder's name, card number (primary account number (PAN)), card expiration date, card security number (also known as a card validation code or card validation value), card pin number, and other cardholder information recognized by those of skill in the art.

Point-of-sale terminals 111, 112, and 113 communicate with payment servers 114 over network (119) to reconcile cardholder transactions. Point-of-sale terminals 111, 112, 113 and payment servers 114 communicate with the Redbox 101 using network 119 which may be a wired network (through ethernet) or a wireless network (using wireless routers). The Point-of-sale terminals 111, 112, 113 may also communicate via secure VPN to servers 907 at the corporate headquarters 900.

The Redbox 101 also recognizes non-cardholder data zones, 120 and 130, which represent devices not including cardholder data. By way of example, in zone 120, office computer 121, IP phone 122, and office laptop 123, which communicate to the Redbox 101 via a wired or wireless network 129, do not contain cardholder data. By way of further example, devices in zone 130, including an access point 131, which manages wireless network (139) for customer laptops or other wireless network capable devices 132, also do not contain cardholder data.

The Redbox 101 detects and collects security information about all the networks 119, 129, 139 in the retail store 100. Further, the Redbox 101 may be configured to report the security information generated from these activities in messages to portal 901 located, for example, at the corporate headquarters 900 of the retail stores 100, through a wireless network 400.

The Redbox 101 may be configured to separately segment zones 110, 120, and 130 into separate networks (or separate sub-networks) based on whether the devices in the zones include card holder data or not. The Redbox 101 may route packets (data) among the zones and through network access device such as a modem, router, or switch (such as a DSL, frame relay, ISDN, Sonet, ATM, Ethernet, Token Ring, wireless, or cable modem, router, or switch) 102 to another device accessible through network 400.

Firewall Protection

The Redbox 101 may be configured to provide firewall services for the retail store 100, protecting zone 110 (and optionally also protecting zones 120 and 130) from unauthorized access, for example, by allowing traffic from internet 400 only if certain criteria such as configurable network addresses and/or UDP and TCP ports match.

In an exemplary embodiment, the Redbox 101 may operate on the Open Solaris™ system, and may use the Open Solaris native firewall IPFilter to provide a robust firewall and logging features. IPFilter is a module implemented on all Redboxes. The firewall rules can be applied to both physical as well as virtual interfaces. In a practical implementation, the firewall rules may be setup globally and either applied globally or to a specific logical interface associated with an individual security zone. Further, firewall rules may be specific to individual business applications. The default rule is, for example, "block in log quick all"/"block out log quick all" which denies all traffic where there is no specific matching rule.

Firewall rules may be stored in a configuration file stored in a directory of the Redbox 101 protected with FTIMES™ (described later). Changes to this file will be detected by FTIMES™. Firewall rules may also be stored on the portal server in a protected directory. A client may maintain a single rule set for all its retail stores. Firewall rules may be kept consistent and updates to firewall rules are typically executed via PUPPET™. Access and control of the firewall rules may be based on permissions within the role based access control (RBAC) framework.

The firewall functionality may also be implemented by network access devices 102 used in the retail stores. Most store locations 100 maintain a broadband router/wireless access point 131, such as a Cisco/Linksys router. This device is in front of the Redbox and does not participate in the protection of card holder data, but does provide basic public open wireless access. Access to either the corporate environment or the location's card holder data environment from the wireless environment is not possible. The Redbox provides both a tight firewall rule and does not allow any routing from this public network to either corporate or the internal store networks.

Finally, firewall functionality may be maintained through a network access device 902 for corporate headquarters 900. This firewall, for example, has three interfaces: public, private, and optional. The optional interface supports a pseudo card holder data environment, and a tight rule set limits traffic flow between private and optional environments, and from public to either optional or private environment.

Role Based Access Control

The Redbox is also configured to control access to zones and components including private data, like cardholder data, within the retail store 100. To achieve this purpose, the Redbox may incorporate, for example, role-based access control (RBAC) to enforce separation of duties per PCI requirements. RBAC is in keeping with the security principle of least privilege, which states that no user should be given more privilege than necessary for performing that person's job. RBAC enables a Redbox to separate superuser capabilities and package them into special user accounts or roles for assignment to specific individuals according to their job needs. This enables a variety of security policies. For example, the use of RBAC along with placing separate security controls on separate virtual machines (within one Redbox) enables the implementation of security in the MPS leading to PCI compliance.

RBAC account provisioning, management, and control may also be handled centrally within the MPS portal infrastructure. One of the servers 907 may be configured as, for example, an OpenLDAP™ server acting as a central repository for of user credentials, role definitions, and role designations. The RBAC model introduces three elements to the operating environment, ¶ Role—A special identity that can be assumed by assigned users only.
¶ Authorization—A permission that can be assigned to a role or user to perform a class of actions otherwise prohibited by security policy
¶ Rights Profile—A package of authorizations that can be assigned to a role or user.

Log Collection

Further, a logging unit 1012 of Redbox 101 may collect and aggregate logs using, for example, syslog-NG, which is an open source log aggregation platform and forward these logs to the central log host 907. The central log host 907 may run, for example, SPLUNK™, which is a log collection and aggregation software package available from Splunk, Inc. of San Francisco, Calif. The collected logs may include logs of the Redbox itself and logs of all or select devices such as logs from point-of-sale terminals 111, 112, 113, payment server 114, manager's PC, OpenVPN servers, MPS portal server and all of its virtual machines and applications.

Each Redbox 101 may send these logs to a central log host 907 (or portal 901), through network access device 102, internet 400, network access device 902, and network 909. The Redbox 101 may send the logs individually or in an aggregate manner.

The above logging and log management functionalities are also implemented in the security portal 901. All logs from corporate devices may be stored on a central log host 907. The central log host 907 is used as a central repository for all log files from every host, for example, within the card holder data environment. The number of devices (L) logging to this system is on the order of $$L = (z*n) + (h*n) + (m),$$

where 'z' represents the number of security zones on the Redbox for your configuration, 'n' represents the number of Redboxes deployed, 'h' represents the number of hosts logging to the store Redbox (this includes windows hosts and other hardware), and 'm' represents the number of devices within the corporate card holder data environment plus any external devices that are logging to this host.

Wireless 3G Backup Network Services

Most store systems have the requirement for some sort of backup network connectivity if the primary network fails. For example, many stores are connected via DSL which may represent a large single point of failure since DSL networks tend to go down intermittently. To circumvent this problem, 3G cellular backup functionality has been added to the MPS. When the primary network fails, the Redbox 101 is configured to re-route all or select traffic to a USB-attached 3G cellular device and transmit data over a wireless connection. The state of the routing is logged by the logging unit 1012 so that the exact status of the routing can be determined at any time for a PCI audit or reviewing bills for cellular carriers purposes. Also, all or select traffic coming through the 3G connection may be encrypted using OpenVPN and filtered by the Redbox 101 firewall, maintaining the separation required for PCI compliance.

Virtual Private Network (VPN) Services

The Redbox 101 provides a virtual private network (VPN) or IPSEC termination for store 100, securely tunneling packets (data) from store 100 devices to another trusted network accessible on internet 400. This feature is particularly useful in saving costs when the store systems and corporate headquarters systems reside on disparate private networks, but need to communicate with each other by traversing consumer grade networks such as DSL networks. For instance, the Redbox 101 may be configured to provide VPN services from zone 110 to a broadband router/modem 902, thus securely tunneling packets (data) from zone 110 to devices communicating with network 909.

Each Redbox is connected over a VPN tunnel, such as OpenVPN™, back to a server at the enterprise resource planning system (corporate headquarters). There may be two VPN servers deployed at the corporate headquarters. One serves as a primary and the other as a backup, which can be brought online manually in the event of a failure of the primary. OpenVPN™ is a virtual private network (VPN) program for creating point-to-point or server-to-multiclient encrypted tunnels between host computers. OpenVPN™ is capable of establishing direct links between computers that are behind NAT firewalls without requiring reconfiguration.

OpenVPN™ uses a secure (OpenSSL™) library to provide encryption of both the data and control channels. It lets OpenSSL do all the encryption and authentication work, allowing OpenVPN™ to use all the ciphers available in the OpenSSL package. It can also use a packet authentication feature (e.g., HMAC) to add additional layers of security to the connection. OpenVPN™ can also use hardware acceleration to get better encryption performance.

OpenVPN™ allows peers to authenticate to each other using a pre-shared secret key, certificates, or username/password. When used in multiclient-server configuration, OpenVPN™ allows the server to create an authentication certificate for every client, using signature and Certificate authority. Once generated, this certificate is loaded onto a Redbox prior to shipment to a store. OpenVPN™ automatically rotates encryption keys at regular intervals.

A user may implement a certificate based system, eliminating a requirement for pre-shared keys that might require key rotation or a more complicated key management process.

Establishment of an OpenVPN tunnel requires the Redbox 101 and the OpenVPN server 907 to authenticate each other via a set of certificates. In order to create certificates for a new Redbox 101, keys are generated on one of the servers 907. Each server contains the server's own public and private keys, and the client's public key. The Redbox client may have a copy of its own public and private keys, and the server's public key. When an OpenVPN client attempts to authenticate to the VPN server, both the client and the server need to have the proper keys or else the encryption handshake will not complete and the OpenVPN™ tunnel will not be established.

When a Redbox is removed from a store, the key files associated with the removed Redbox are removed from the server, preventing it from connecting in again. Removal of the keys may be done within 24 hours of the Redbox removal.

Network Rogue Detection

Redbox 101 may also provide rogue device detection services for the retail store 100, by detecting unauthorized access points or unauthorized end user devices attached to the store network, by using, for example ARPWATCH™, an application developed by Lawrence Berkeley National Laboratory's Network Research Group.

ARPWATCH™ is a monitoring agent implemented on the Redbox for rogue access point detection. Generally, there are at least four IP hosts present in the retail store network. For example, the four hosts may be the Redbox, the manager's PC, a (Verifone) payment terminal 1, and a (Verifone) payment terminal 2. The presence of any other hosts, including rogue access points, are detected via ARPWATCH™.

ARPWATCH™ is a utility that monitors "ARP" table activity and can provide a report or alert when new devices are being introduced to the network. ARPWATCH™ capability may be added to the Redbox which will be used to alert when any unknown or unauthorized network devices are being added to a Redbox monitored network. Applicant's ARP-WATCH™ implementation may be coupled both with NAGIOS™ for real-time alerting of new network device detection, along with central reporting of the logs, which will be protected with FTIMES™, via the overall MPS log management infrastructure. The Redbox 101 may be configured to communicate detected rogue devices (such as unauthorized access point, client, or server devices) to portal 901.

In addition to Arpwatch, which monitors the network for new ARP table activity, the store network may also be scanned for all or select wireless transmissions. For this purpose, an 802.11.x device for detecting wireless transmissions, such as 802.11.x transmissions, may be plugged into a USB port of the Redbox 101. In an exemplary aspect, the 802.11.x device listens for all or select wireless signals, but because the 802.11.x device is in its own device, it would be isolated from the rest of the system involved in card data transmission paths.

Intrusion Detection Services (IDS)

Further, the Redbox 101 may be configured to provide intrusion detection services for store 100, for example using an open source network intrusion prevention and detection system such as SNORT™ to communicate any detected intrusions into the network environment. The Redbox 101 may be configured to communicate detected intrusions to portal 901.

System Integrity Management

An fintegrity unit 1013 of Redbox 101 also provides file integrity monitoring, for example using FTIMES™, a system baselining and evidence collection tool available from SourceForge, Inc. of Mountain View, Calif. on the web. The PCIDSS requires monitoring and validation of the integrity of systems and their resulting log files. The FTIMES™ application may be deployed to validate system integrity on multiple levels.

FTIMES™ (File Topography and Integrity Monitoring on an Enterprise Scale) is an open source file integrity monitoring package. FTIMES™ constructs maps of file systems that can then compared with more recently constructed maps to identify any changes that have taken place. The implementation of FTIMES™ for file integrity monitoring of retail systems uses the documented BIMVS (Basic Integrity Monitoring over SSH). This implementation allows an 'FTIMES server' to contact and 'FTIMES client' and map the clients file system over and store the output on a server. Asymmetric keys may be used so no credentials are exchanged in clear text. Furthermore, connections are allowed to be made only from 'authorized' hosts, and only specific commands are permitted from those hosts. Configuration files are used to 'snapshot' the specific system directories on Microsoft Windows (store registers) and Solaris (Redboxes, RBCs, managers) systems.

The Redbox (101) serves as an FTIMES server to the retail store (100) environments as well as an FTIMES client to a central integrity server 907 in the corporate headquarter. The Redbox 'integrity unit' 1013 connects to store registers 111, 112, 113 and stores maps of each register's file system and compares the stored file systems with previously stored file systems. Any changes to the file system are sent to a central log host 907 at the corporate offices for review. In turn, the central integrity server 907 at the corporate headquarters offices, runs FTIMES against each deployed Redbox's file system. This allows for notification of any changes to the configuration of the Redboxes themselves.

FTIMES™ runs by using a configuration file to determine which parts of the file system to map. This mapping can be a full file system map, or a selection of critical system to reduce the overhead and bandwidth to map the entire file system of each monitored device over the network. In an exemplary aspect, FTIMES™ may be used to monitor file integrity against the Windows\system32 directory and/or the POS application directory.

The Redbox, using FTIMES™, may be configured to monitor files stored in point-of-sale terminals 111, 112, and/or 113, generate signatures for those files, and compare past generated signatures with current signatures in order to detect a change in those files. The Redbox may also monitor files of other devices within zone 110, such as the files of payment server 114. The Redbox may provide the results of such monitoring and results thereof as messages to portal 901.

System Vulnerability Management

The Redbox may provide further protection for retail store 100 and cardholder data zone 110, by scanning the UDP and TCP ports of all or selected devices in zone 110 (through network 119) for vulnerabilities. The Redbox may use, for example, an open source vulnerability scanner available from Tenable Network Security of Columbia, Md., called NESSUS™ to scan for any system vulnerabilities and rouge hosts/devices. The Redbox 101 may be updated to run closed source versions of vulnerability scanners as well.

The process of executing and analyzing periodic (for example, monthly) scans may be carried out using NESSUS. Any noticed variance is logged and reported to all or selected devices within MPS. NESSUS may be integrated in the scanner unit 1014 of the Redbox 101 to scan all or selected devices within MPS. The Redbox, integrated with NESSUS, may also be used to scan hosts/devices external to the MPS accessible through the network.

The Redbox 101 may report further events and alerts to portal 901, for example using NAGIOS™, an event monitoring system from Nagios Enterprises, LLC of Saint Paul, Minn.

Additionally, NAGIOS™ may be used to monitor the Redbox (101) itself. Redboxes and other critical systems are monitored centrally for critical events and alerts and these are reported on in real-time. A NAGIOS™ server may be comprised in server 907 at the corporate headquarter 900 and may be used for this purpose. In addition, the quality of the network connections and the VPN tunnel may be monitored with a system called SMOKEPING™.

Further, NAGIOS may be used to monitor all the Redboxes and all the portal servers located at all the retail stores 100, 200 within a corporate environment. The NAGIOS™ server runs on one of the servers 907 at the corporate headquarters. The NAGIOS™ server checks at least, the availability of, for example, a SSH daemon by connecting to the IP address of a global unit 1011 of the Redbox, ICMP availability of the Redbox by using a ping command to check connectivity to the IP address of the global unit on the Redbox to allow the headquarters to detect the integrity of the VPN tunnel connecting the headquarters to the Redbox, a level of free disk space on the Redbox, in all or select file systems (/export, /var, and /tmp filesystems), with the ability to generate a warning when, for example, 15% of disk space is free, and to generate a critical alert when, for example, 5% of the disk space is free, the status of a default gateway to ensure that it is properly routing over the VPN tunnel, and the status of the logging process to ensure that it is running on the Redbox.

The headquarter 900 uses remote checks from the NAGIOS™ server 907 to monitor ICMP and SSH, and using NAGIOS™ pluggins or custom scripts on the Redboxes over a tunnel, the server 907 checks the status of at least the logging process, disk space, and default gateway status.

The portal 901 serves as a clearinghouse of security information for all the retail stores 100. Portal 901 may be accessed by administrative users via a web browser, through a secure protocol, such as HTTPS. For example, an administrative user might use a web browser executing on a computer 903 (such as a laptop computer) to login to and access portal 901, thereby receiving information including alerts generated in a store 100. Further, an administrative user might receive an alert in the form an email from portal 901.

Corporate Headquarters

Portal 901 may be run on any of a variety of servers located at corporate headquarters 900. The portal 901 may be run, for example, on a SUN SOLARIS™ 10 server from Sun Microsystems, Inc. of Santa Clara, Calif. An exemplary security portal environment 901 includes at least one processor to provide at least a central (SYSLOG-NG™) server for aggregation and analysis of collected logs, a server (OpenLDAP™) as a central repository for of user credentials, role definitions, and role designations, a server (PUPPET™) to perform remote system administration commands, a server (NAGIOS) as an event monitoring system, a server (NESSUS™) to scan for any system vulnerabilities and rouge hosts/devices, a central server (FTIMES™) for system baselining and evidence collection, an antivirus and anti-malware solution server (ClamAV™), and an intrusion detection server (SNORT™) to communicate any detected intrusions into the network environment. For example, servers (907) at the enterprise resource planning system serve functions including VPN servers, PCI portals, Bastion Access servers, and Host servers. These servers (907) may use the Open Solaris and/or the Microsoft operating systems to serve the above functions.

Figure 2:
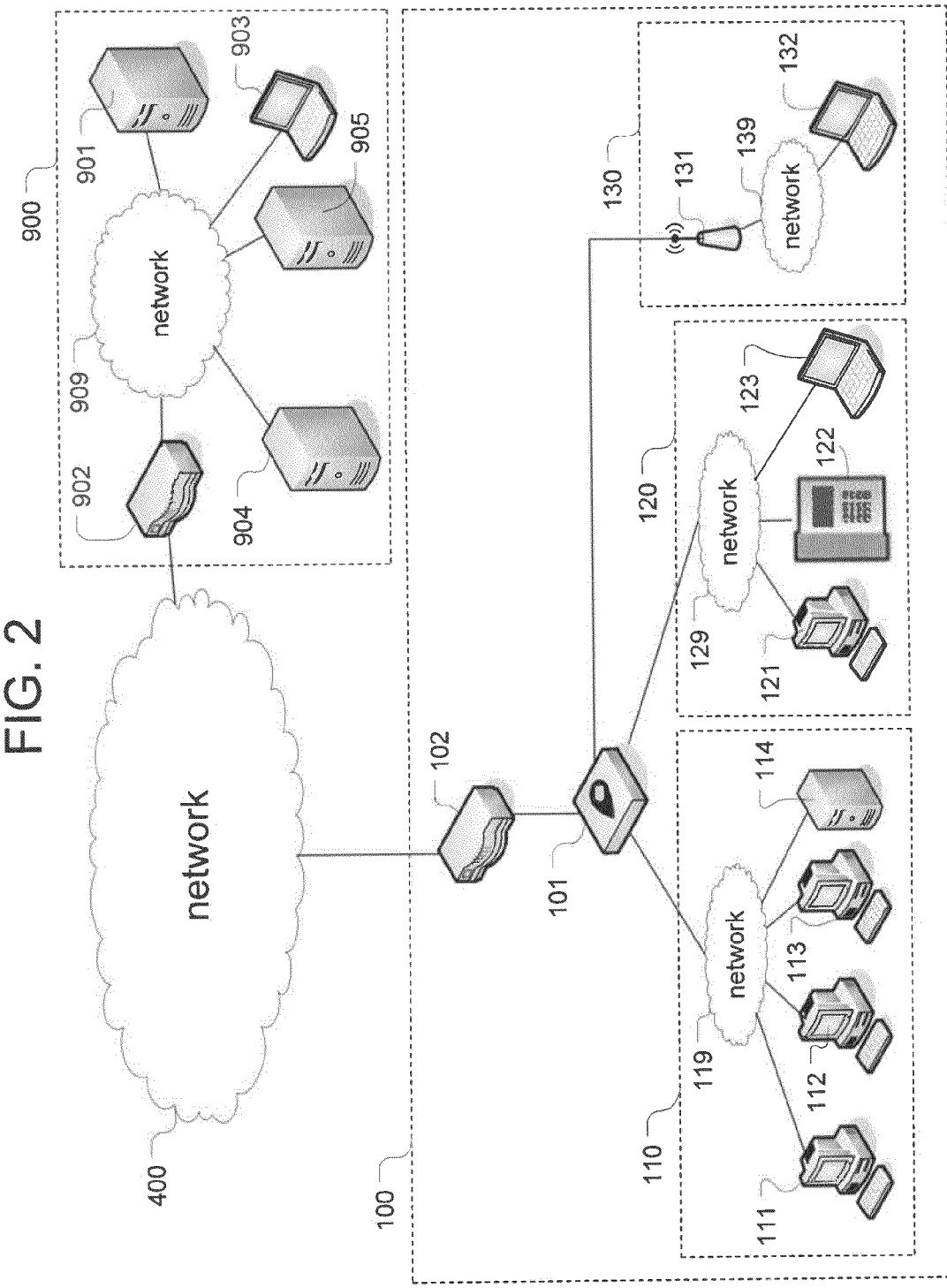
FIG. 2 is a further exemplary architecture of an embodiment of the invention including file integrity monitoring and ticketing mechanisms.

FIG. 2 shows additional servers at the corporate headquarters 900, such as a file integrity monitoring server 904 configured to monitor the integrity of the file systems of the Redbox 101. The file integrity monitoring server 904 may also be configured to monitor the integrity of the file systems of the Redboxes in each of a plurality of stores, and report the results of the monitoring to portal 901.

The corporate headquarters 900 may also include a ticketing server 905 which tracks tickets created as a result of system alerts. For example, every time an alert is generated in the MPS system, a corresponding ticket is created to ensure that the issue that resulted in the generation of the alert is addressed. The ticketing server 905 allows users to create, view, and modify, and (with proper authority) close created tickets.

The ticketing server may be, for example, a JIRA™ server which allows a user to associate a created ticket with a specific Redbox or other devices in the system. In an exemplary embodiment, the ticket remains active in the system until the issue that resulted in the generation of the alert is addressed.

Figure 3:
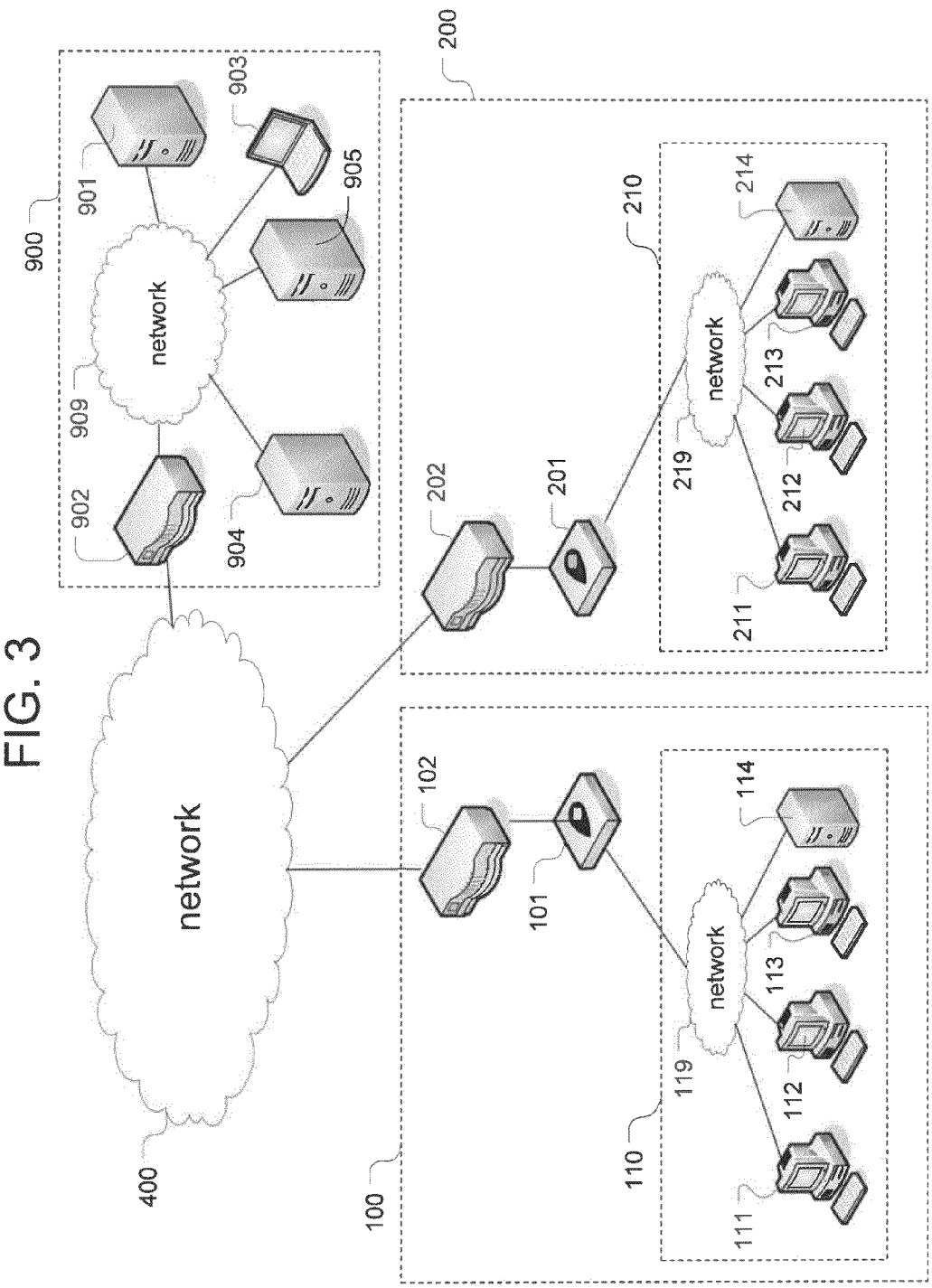
FIG. 3 is a network diagram depicting a plurality of stores.

FIG. 3 depicts an exemplary environment with a plurality of stores. Store 200, for instance, includes a Redbox 201 configured to execute at least one of a plurality of security functions protecting store 200 and cardholder data zone 210, as previously discussed. The Redbox 201 similarly protects point-of-sale terminals 211, 212, 213 and payment server 214, which communicate via network 219. A network access device 202 (for example, a broadband modem or router) provides connectivity for devices in store 200 to the internet 400.

Figure 4:
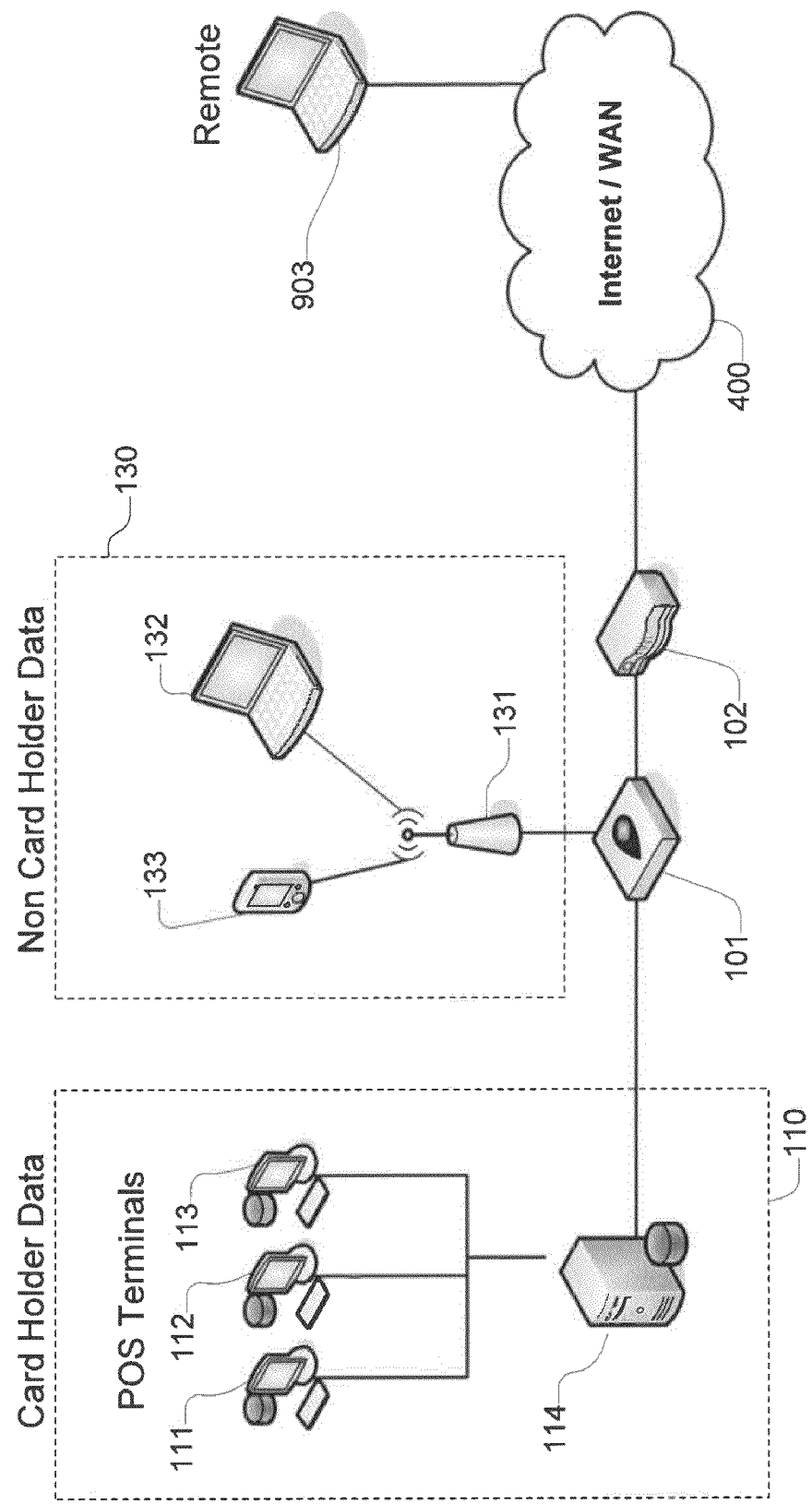
FIG. 4 is a network diagram depicting a simplified store environment according to an embodiment of the invention.

FIG. 4 depicts a network data flow diagram for a simplified store environment. Cardholder data transmitted, processed, and stored on point of sale terminals 111, 112, 113 are protected by the Redbox 101 from attacks from the internet (or WAN) 400.

The Redbox 101 may be remotely managed by an authorized user via a remote computer 903. The same tools that enable low-cost remote deployment model can be used to improve efficiency of ongoing management. From simple system tweaking such as changes in firewall rules to delivery of new controls through major system upgrades, MPS remote access and management software provide the flexibility to make changes without ever entering the retail store. The Redbox remote monitoring system provides alerts on a wide variety of system health, configuration and performance status events.

Communications of other devices which do not store, process, and/or transmit card holder data and which are not part of a CDE of the retail store, such as portable data terminal 133 and laptop 132, may be isolated from communications of the cardholder data zones by the Redbox 101 through network segmentation, as discussed above.

Figure 5:
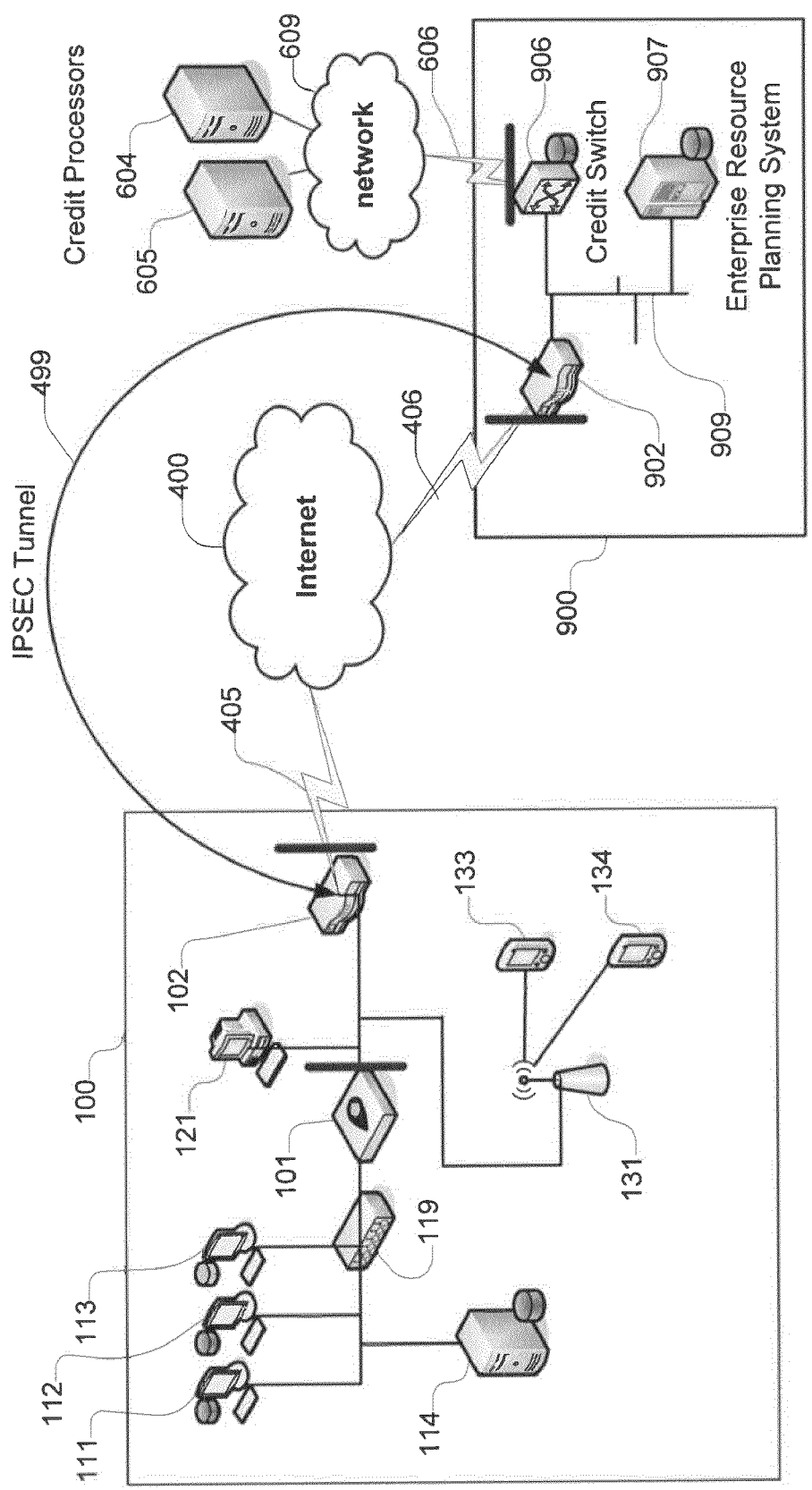
FIG. 5 is a network diagram depicting a store network and a remote corporate headquarters network according to an embodiment of the invention.
Figure 6:
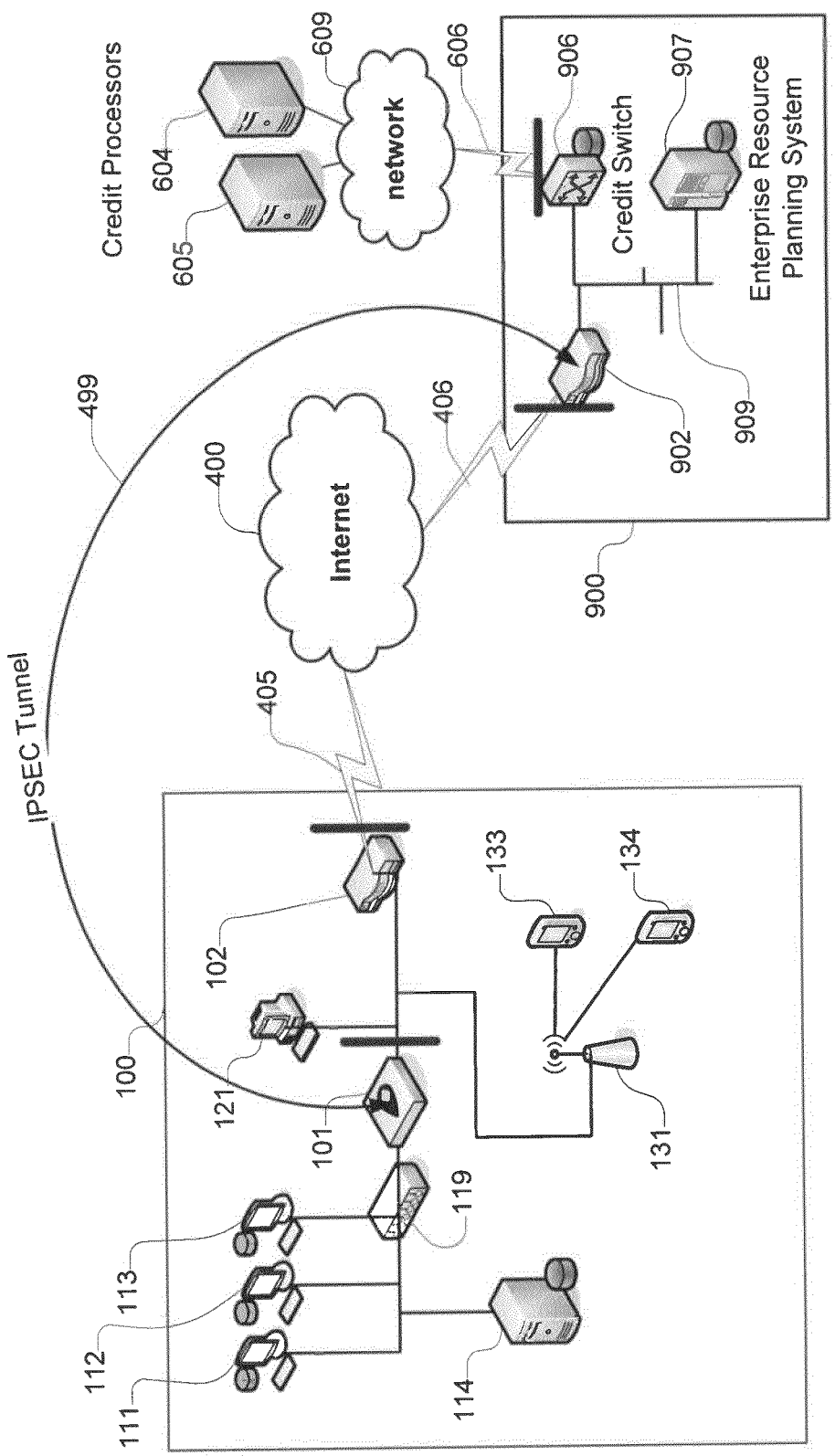
FIG. 6 is a network diagram depicting a store network and a remote corporate headquarters network according to another embodiment of the invention.

FIG. 5 depicts an exemplary network diagram with the store network and a remote corporate headquarters network 900. The Redbox 101 protects devices with cardholder data, such as terminals 111, 112, 113, and server 114. The communications between devices within the network of retail store 100 and devices within corporate network 900 (such as a corporate headquarters network) are secured via a secure tunnel (such as a SSL VPN tunnel) between network access devices 102 and 902, or between the Redbox 101 and network access device 902, as shown in FIG. 6. Payment server 114 communicates with credit switch 906 to reconcile cardholder transactions through network 119 (for example, an Ethernet hub or switch), the Redbox 101 and/or network access device 102 (implementing firewall functionality), a secure tunnel (SSL) to network access device 902, across a network 909, to credit switch 906. In turn, credit switch 906 communicates 606 through a firewall (implemented on credit switch 906) through network 609 with credit processors 604 and 605. The security portal 901 may be included in server 907 located at the corporate headquarters network 900.

The embodiment illustrated in FIG. 6 is different from the embodiment illustrated in FIG. 5 in that the IPSEC tunnel in the exemplary embodiment of FIG. 6 is implemented between the Redbox 101 and the network access device 902. The Redbox 101 of the exemplary embodiment illustrated in FIG. 6 may also provide firewall protection, as discussed above.

Figure 7:
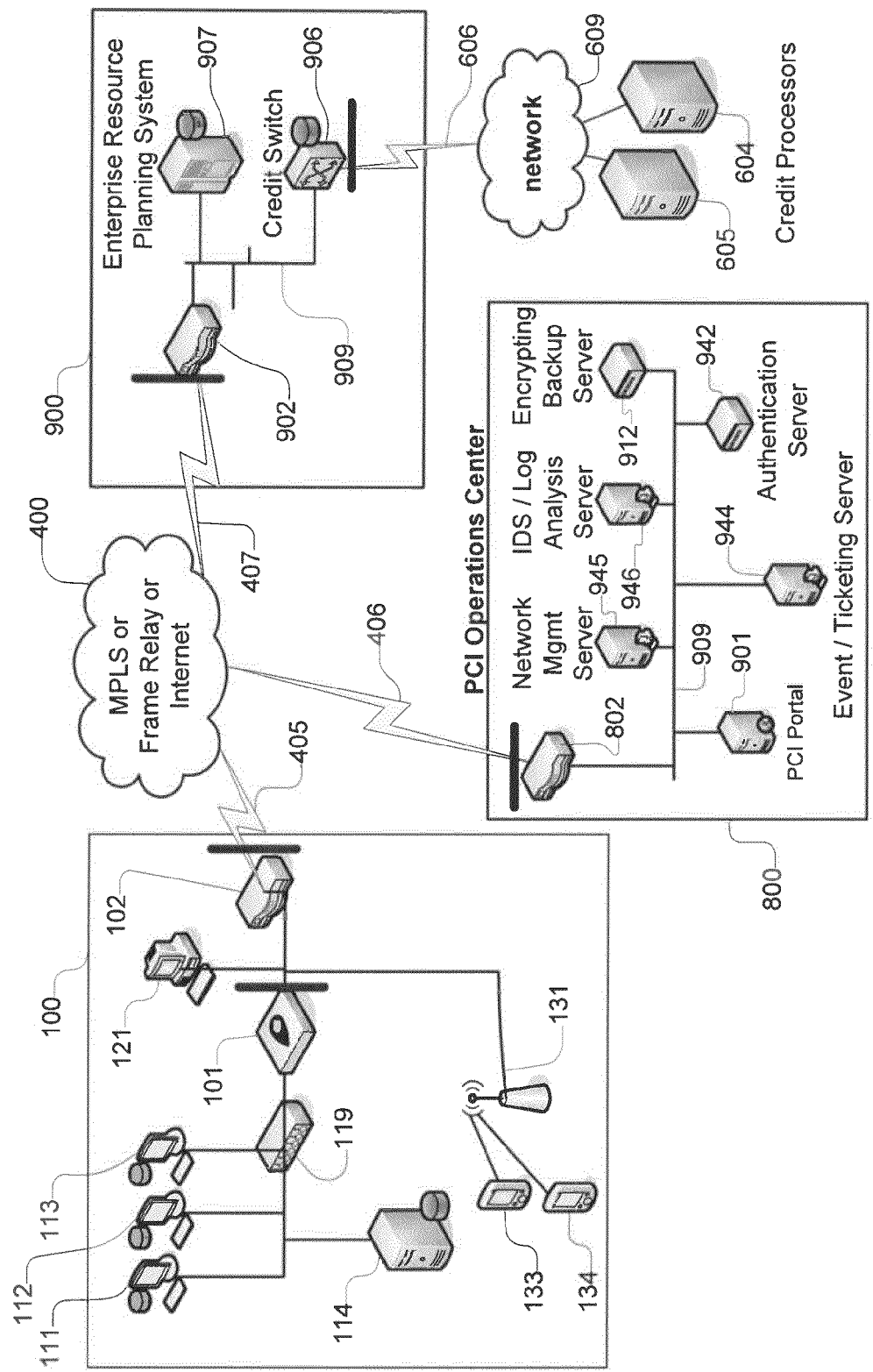
FIG. 7 is a network diagram depicting a store network, a corporate network, and an operations center according to an embodiment of the invention.

FIG. 7 depicts a further exemplary system network diagram, depicting a store network 100, a corporate network 900, and a control operations center 800. The portal 901 may reside in an operations center 800 operated by a different party than corporate network 900. Herein, the portal may be functionally decomposed into a network management server 945, an intrusion detection and log analysis server 946, and encrypting backup server 912, an authentication server 942, an event and ticketing server 944 and the front-end portal web server 901.

Figure 9:
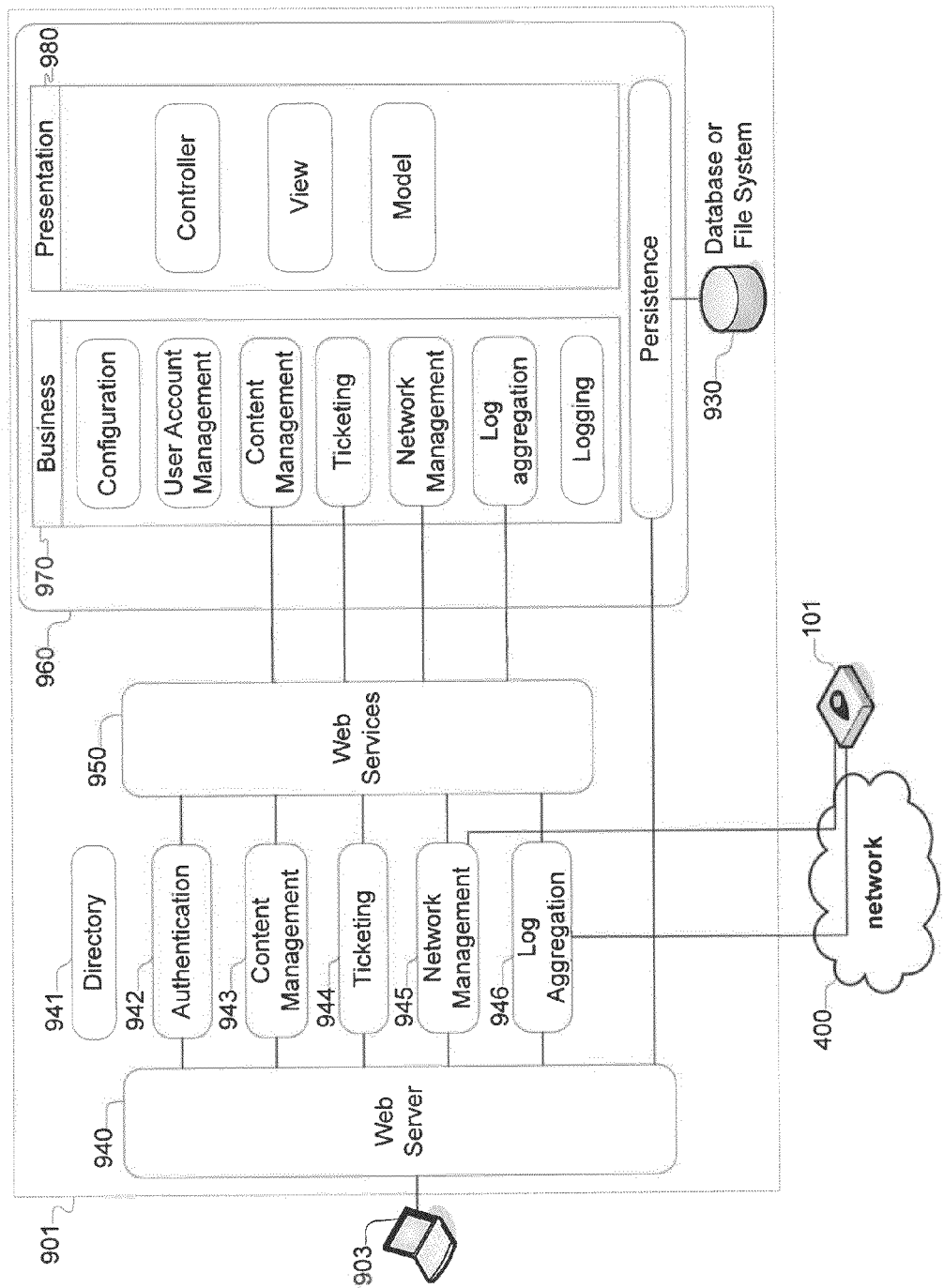
FIG. 9 is an exemplary portal software component architecture according to an embodiment of the invention.

The network management server 945 operates according to, for example, an application like ZENOSS™ to monitor the network environment. The network management server 945 securely obtains network information within the retail store 100 from Redbox 101 through network 400. One of the main functions of the network management server 945 is to identify when a critical event has occurred in, for example, a Redbox, and to locate the sources of such events. The network management server 945 may also enable display of the overall status of the MPS system in the form of network maps or tabular information. As shown in FIG. 9, the network management server 945 also interfaces with a web server 940 through which an authorized user with laptop 903 is provided the requested information.

The intrusion detection (IDS) and log analysis server 946 obtains and aggregates the logs taken by Redbox 101 of the devices within the retail store 100. These logs are then analyzed in the server 946 and the resulting information may be provided to an authorized user with laptop 903 through web server 940. As discussed above, the log aggregation and analysis may be performed using SPLUNK™. Server 946 allows users to quickly search through logs generated by, for example, the Redboxes and the MPS portal 901 itself. Further, Splunk may be configured to provide alerts when certain types of events occur. For example, Spunk may be configured to search the logs periodically (hourly, etc.) to look for intrusions and examples of unauthorized users logging onto systems and unauthorized devices via Arpwatch, and provide corresponding alerts.

The SPLUNK™ software may also run on a central log host 907 at the corporate headquarters 900, indexing the log data as it comes in. With SPLUNK™, the use of saved searches, custom dashboards and standard regular expression matching engines allow for visibility into the 'logged' environment with precise confidence using a flexible query language based on SQL.

The authentication server 942 may implement a central authentication service (CAS). CAS is an authentication system that provides, for example, an enterprise-wide single sign-on process. The authentication server 942 provides the user interface for login and logout. CAS may also enable a single sign-off process for terminating a user's session for all the applications. This feature eliminates the need to log out of each application separately, and it also critical in implementing role based access controls.

The event and ticketing server 944 may use the open source application such as JIRA™ to manage tickets created based on the generated alerts or tasks to be performed in the system. In an exemplary embodiment, the event and ticketing server 944 enables the reporting of problems that require investigation or correction, the reporting of all required system changes, tracking progress of problem resolution, and providing a record of approved changes in compliance with PCI specifications. The event and ticketing server 944 also enables the creation of tickets via emails directly sent to the server 944. All the information regarding the system tickets may be provided to an authorized user with laptop 903 through the web server 940.

The encrypting backup server 912 stores information such as passwords, certificates, and public and private keys required to enforce and maintain encrypted tunnels for information transfer between host computers in the MPS system, for example, between a Redbox 101 in a store and a portal 901.

Also, as shown in FIG. 7, the payment server 114 communicates across network 119, Redbox 101, network access device 102, across a network (such as Multiprotocol Label Switching (MPLS), frame relay, or internet) 405, 400, 407, through a network access device 802, and across a network 809 to communicate with credit switch 906. Select or all store devices may also communicate along the same path to the corporate headquarters 900 which functions as an enterprise resource planning system (for example, a SAP™ server as provided by SAP of Walldorf, Germany).

Figure 8:
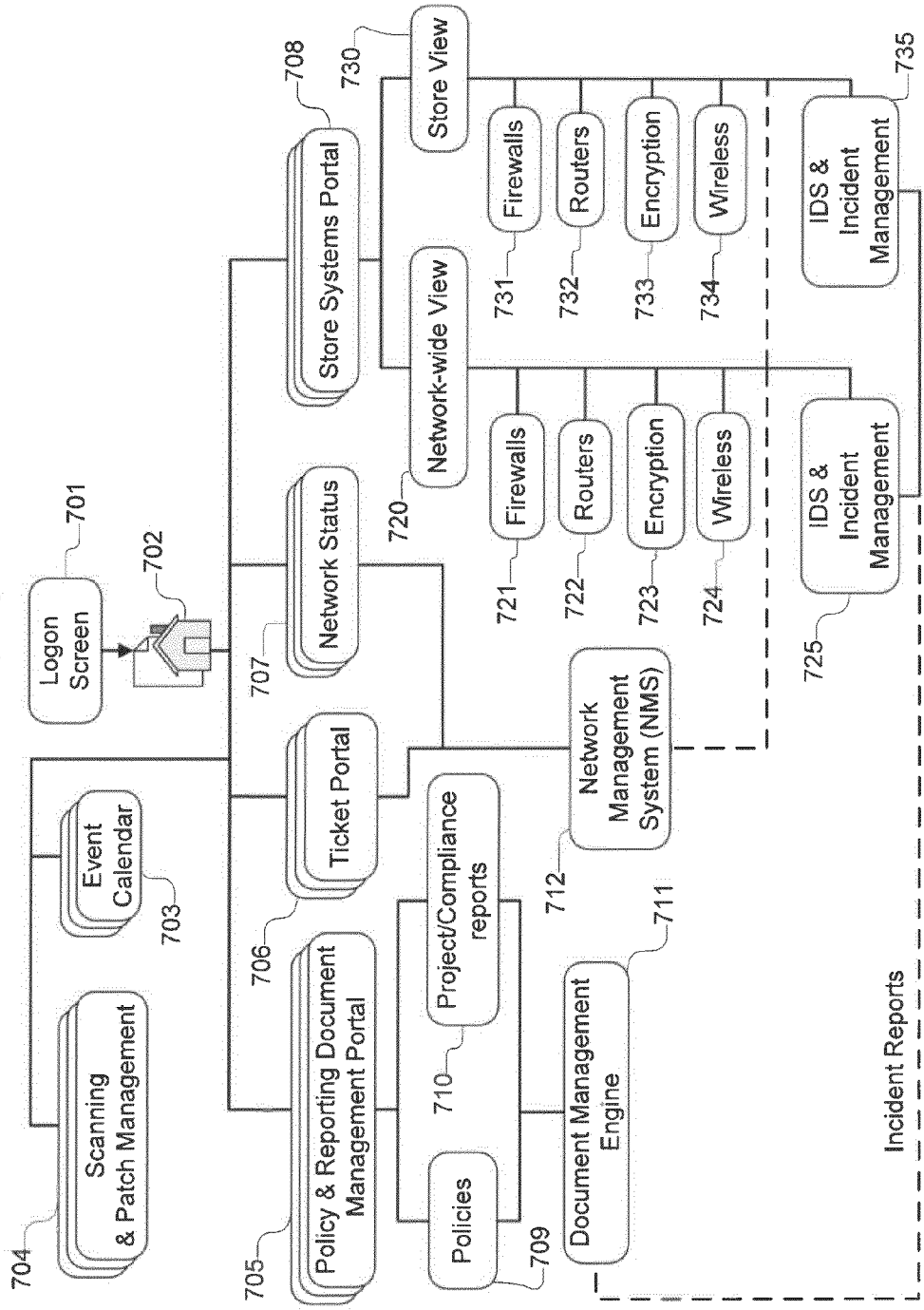
FIG. 8 is an exemplary portal interface architecture according to an embodiment of the invention.

FIG. 8 depicts an exemplary portal interface architecture. Upon initially accessing the portal 901, a web browser presents a logon screen 701 to gain access to the corporate network environment associated with the portal. Upon login, the web browser presents a home page 702 comprising hyperlinks to scanning and patch management information 704, an event calendar 703, a policy & reporting document management portal 705, a ticket portal 706, network status information 707, and a store systems portal 708. The store systems portal provides hyperlinks to both a network-wide view 720 and a store view 730.

The network-wide view 720 provides a status view and a management interface for all virtualized devices and the Redbox hosts across multiple stores. In an exemplary embodiment, the network-wide view 720 provides hyperlinks to information regarding network firewalls 721, routers 722, encryption 723, wireless 724, intrusion detection system and incident management system information 725.

Similarly, store-wide view 730 provides a status view and a management interface for all virtualized devices and the Redbox host in every store. In an exemplary embodiment, store view 730 provides hyperlinks to information regarding store firewalls 731, routers 732, encryption 733, wireless 734, and intrusion detection system and incident management system information 735.

Network management information may be provided by a network management system 712, such as Open NMS™, an open-source network management software provided by SourceForge, Inc. of Mountain View, Calif. A policies and reporting hyperlink on the home page provides access to the policy and reporting document management portal 705 in which details regarding policies 709 for assuring PCI compliance, and project/compliance reports 710 for the same, can be viewed. These documents are managed in document management engine 711.

FIG. 9 depicts an exemplary portal software component architecture 901 comprising a directory 941 for central repository of user credentials, role definitions, and role designations. The architecture also includes a web server 940 like APACHE™ providing centralized and secure SSL access, having a unique address for each resource, to an authorized user with computer 903. For instance, the web server 940 provides access to the central authentication service server 942, a content management server 943 operating an application like ALFRESCO™, ticketing server 944 operating an application like JIRA™, a network management server 945 operating an application like ZENOSS™, and a log aggregation server 946 operating an application like SPLUNK™.

In an exemplary embodiment, the content management server 943 acts as a repository for storage and display of documents required for PCI compliance, and is responsible for categorizing these documents. The content management server 943 may also issue automated notification of compliance status.

The network management server 945 and the log aggregation server 946 obtain log information from the appliance 101 through a network, and provide this information to the computer 903. Further, the portal software component architecture includes web services 950 like AXIS2™ to connect the servers 942, 943, 945, and 946 to an application server portal 960. Web services 950 mediates requests and responses related to portal 960, and ensures security by providing isolation of business logic in portal 960 and the web service interface details.

The server portal 960 provides portal framework and user management feature including a business 970 and a presentation 980 features. The server portal 960 is connected to an electronic database/memory 930 for storing, for example, file system information.

Figure 10:
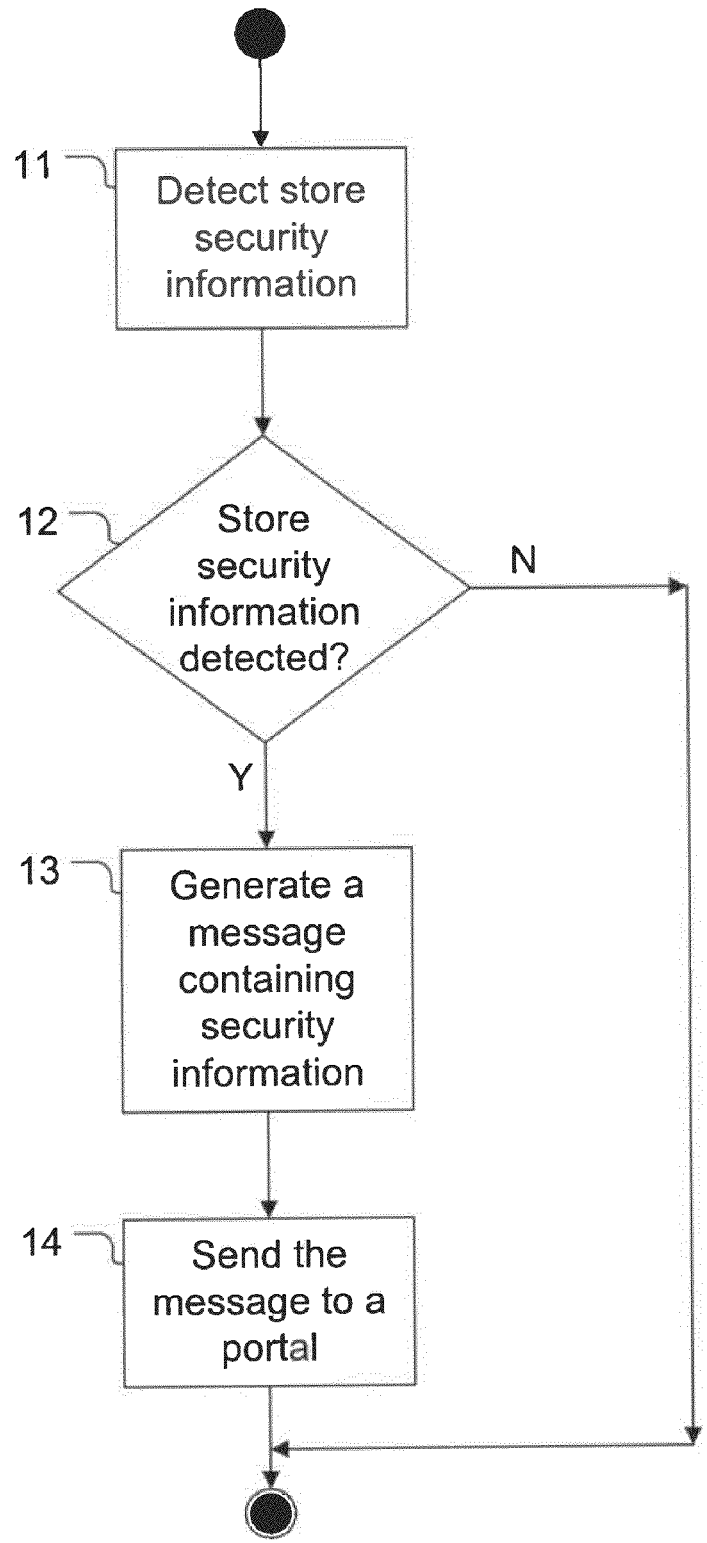
FIG. 10 is a flowchart describing an exemplary method implemented by a payment card industry network appliance (Redbox) to protect cardholder data according to an embodiment of the invention.

FIG. 10 is a flowchart describing an exemplary method implemented by a processor of a Redbox to protect cardholder data. The Redbox detects store security information (step 11) generated as a result of at least one of the plurality of security functions it is performing. If a store security information is detected (step 12), the Redbox generates a message containing security information (step 13), and sends the message to the portal 901 (step 14). Upon completing execution of the method of FIG. 9, the Redbox may again attempt to detect store security information (step 11), or may execute other instructions before again attempting to detect store security information (step 11). Additionally, the store security information may be logged and transferred to portal 901 without the corresponding alerts being generated, and at the portal 901, Splunk may be configured to index the store security information logs and generate alerts based on specific predetermined criteria.

Figure 11:
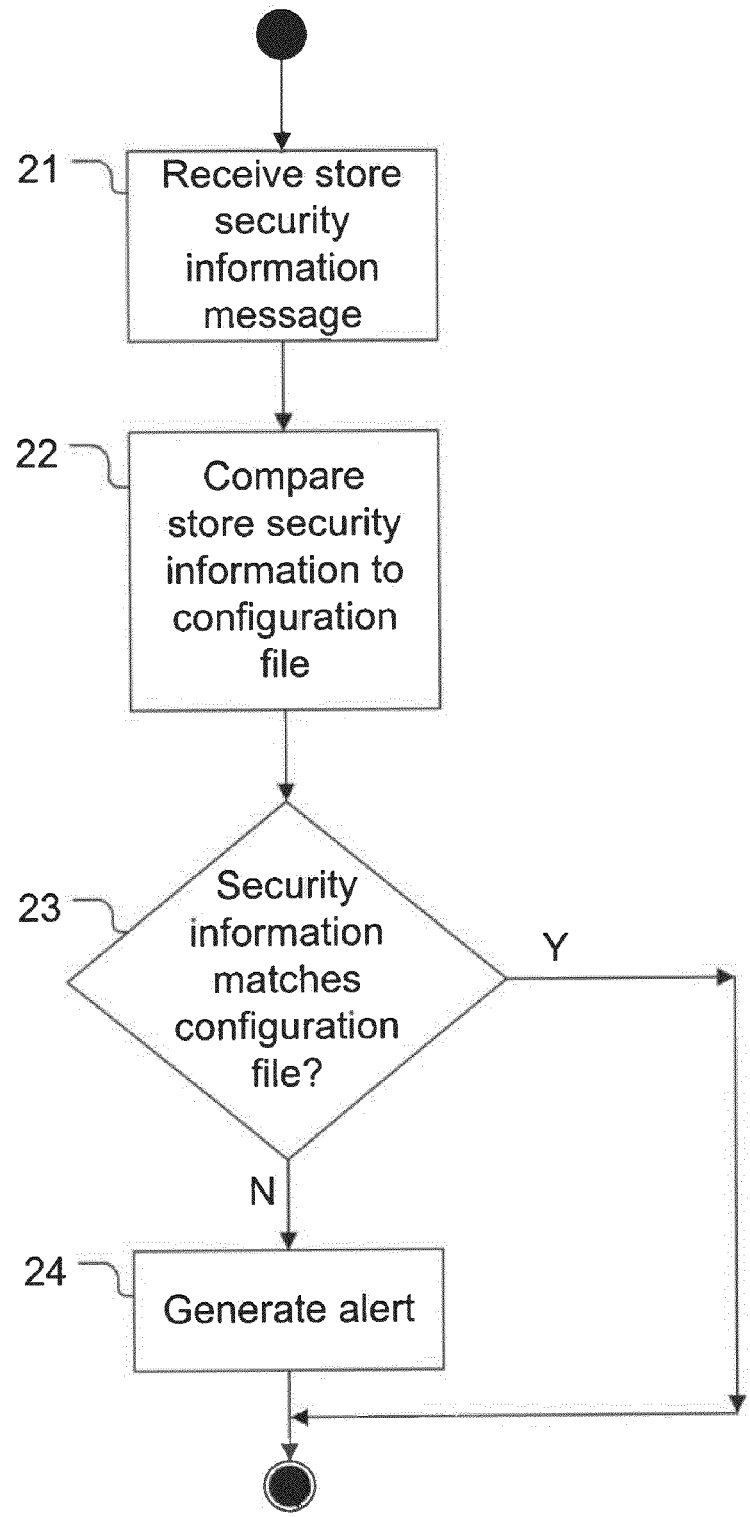
FIG. 11 is a flowchart describing an exemplary method implemented by a portal to protect cardholder data according to an embodiment of the invention.

FIG. 11 is a flowchart describing an exemplary method implemented by a processor of a portal 901 to protect cardholder data. Upon receiving a store security information (step 21) from Redbox 101, the portal 901 compares the store security information to a configuration file (step 22) stored in a memory or constructed by the portal. If the security information does not match the configuration file (step 23), the portal automatically generates an alert (step 24). This allows, for example, the automation of the MPS to regulate PCI compliance.

FIG. 10 denotes a white-list approach to the matching of the configuration file, where certain portions of the configuration file indicate explicit allowance and have a default assumption that a non-matching entry is not allowed. The method of FIG. 10 and the configuration file can alternatively be implemented in a functionally equivalent blacklist, where certain portions of the configuration file indicate explicit denial and have a default assumption that a non-matching entry is allowed. Another functionally equivalent implementation would be a hybrid approach, where certain portions of the configuration file are white-list matched and other portions of the configuration file are blacklist matched.

Figure 12A:
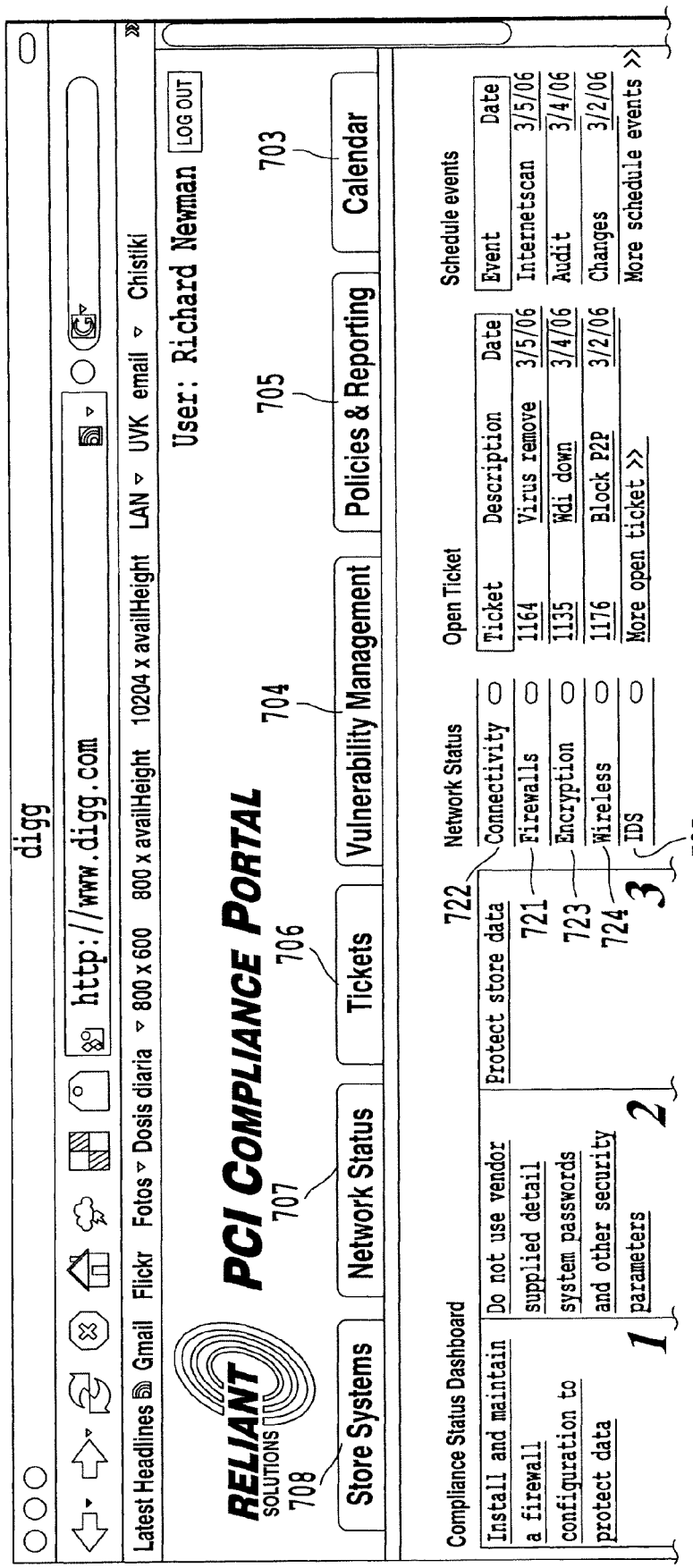

FIGS. 12A-B are screen shots of an exemplary portal showing a summary of statuses of various components of the security portal including compliance status, network status, open tickets, and scheduled events. Accessible as home page 702 of FIG. 7, the page presents hyperlinks to store systems 708, network status 707, tickets 706, vulnerability management 704, policies and reporting 705, and an event calendar 703. Information regarding a specific store may be obtained by selecting the specific store from a pull-down menu called "Store Status." Further hyperlinks to network-wide routers 722, firewalls 721, encryption 723, wireless 724, and intrusion detection system 725 are also provided for an authorized user to be able to obtain further details regarding the individual components.

FIG. 13 shows exemplary secure information provided to IT, compliance managers, and auditors as evidentiary output of the store's PCI compliance, as displayed on the homepage 702.

Figure 14A:
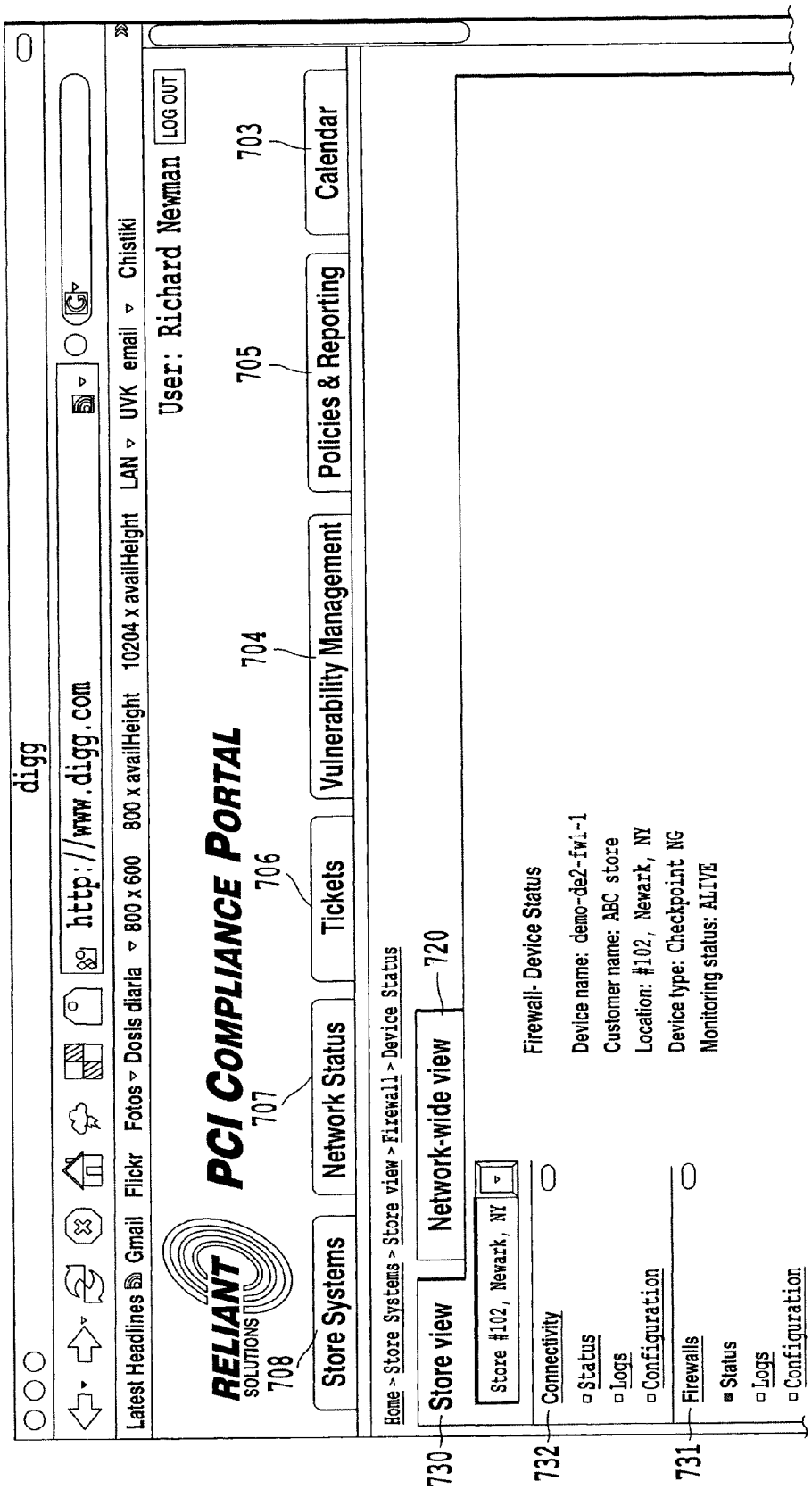
FIGS. 14A-B are exemplary portal screen shots, depicting a device status of a firewall according to an embodiment of the invention.
Figure 14B:
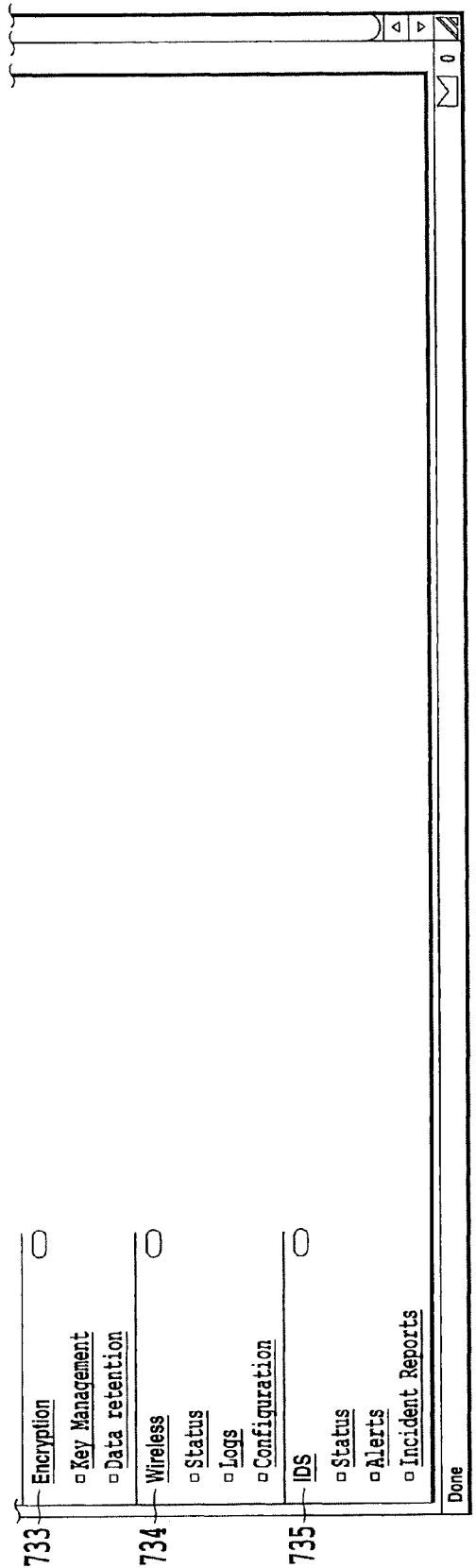

FIGS. 14A-B show exemplary information regarding the status of network firewall devices for a selected store, as obtained by navigating through the network firewalls 731 hyperlink provided in the store view 730.

Figure 15B:
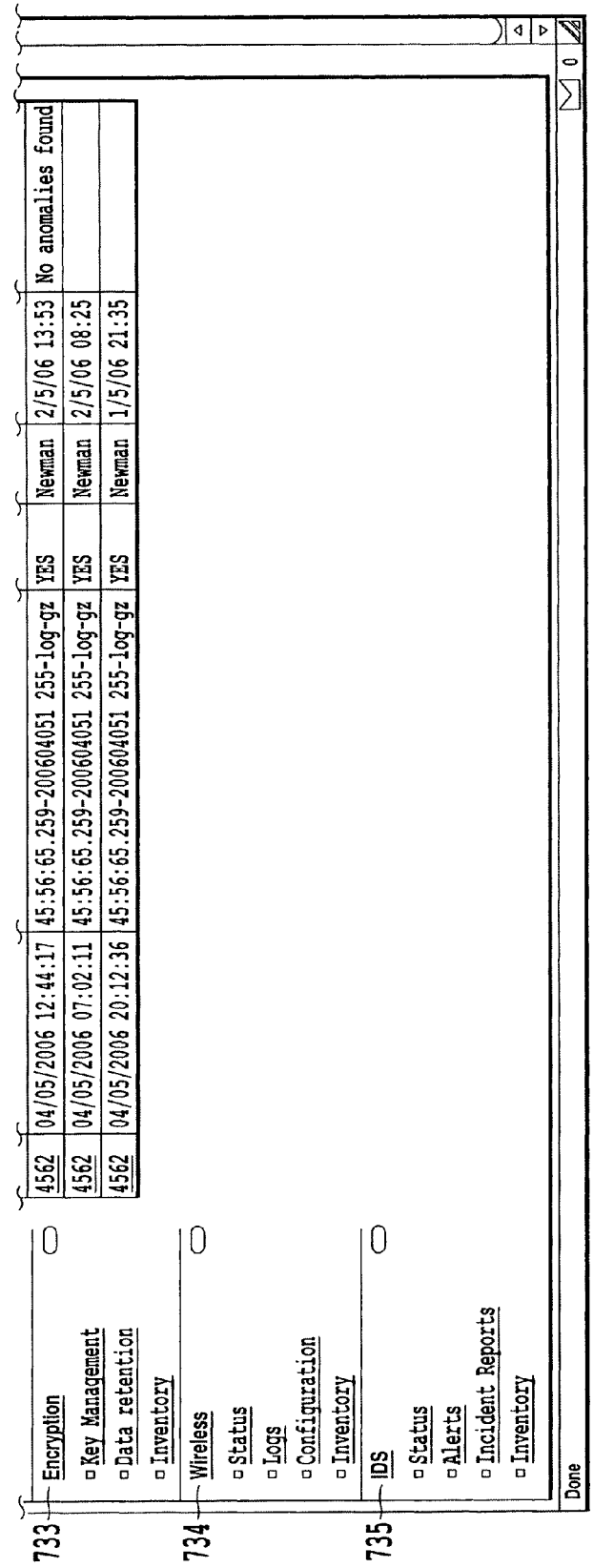

FIGS. 15A-B show exemplary information regarding the network firewall logs for a selected store, as obtained by navigating through the router hyperlink 732 provided in the store view 730.

Figure 16A:
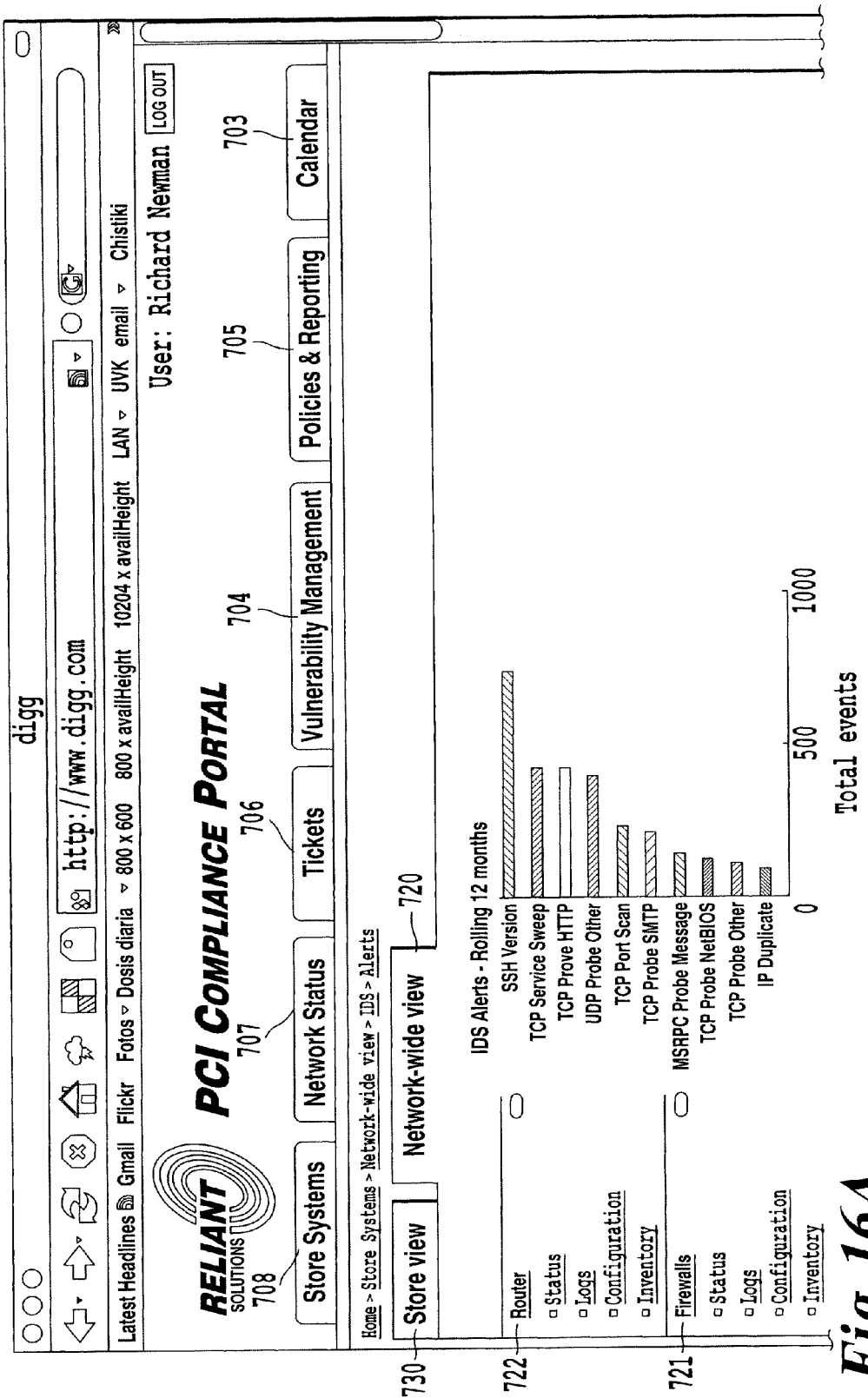
FIGS. 16A-B are exemplary portal screen shots, depicting network intrusion detection alerts according to an embodiment of the invention.
Figure 16B:
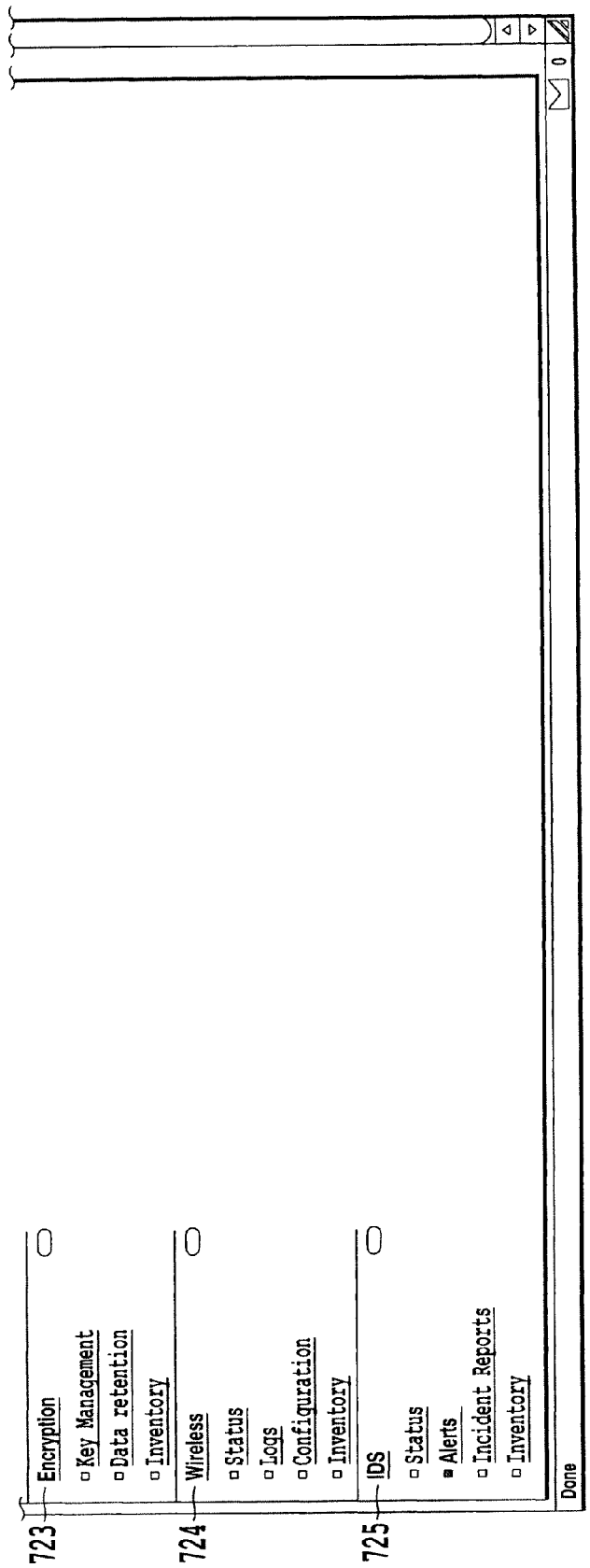

FIGS. 16A-B show exemplary information regarding the intrusion detection system and incident management system for a selected store, as obtained by navigating through the IDS hyperlink 725 provided in the network-wide view 720.

Figure 17A:
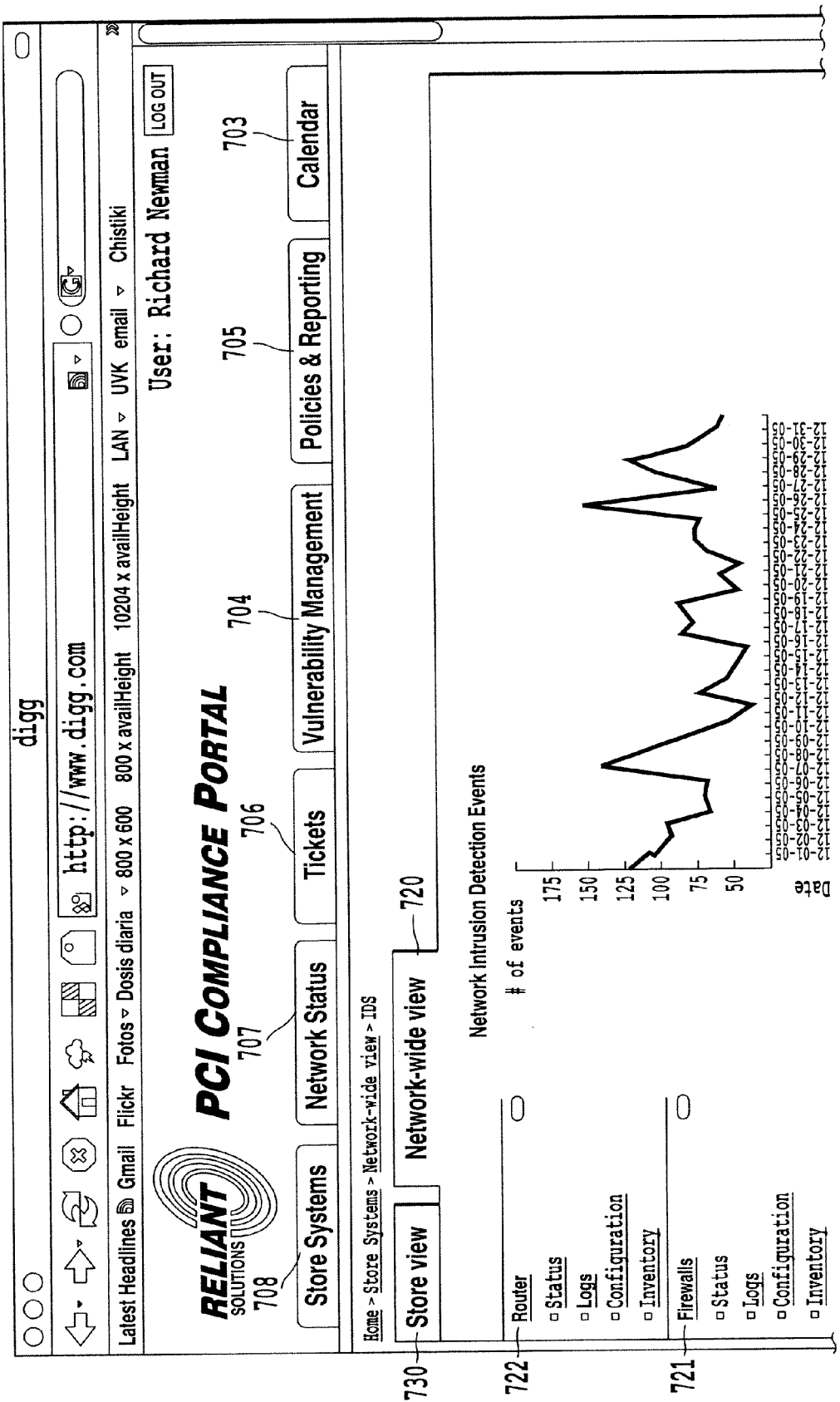
FIGS. 17A-B are exemplary portal screen shots, depicting a graph of network intrusion detection events according to an embodiment of the invention.
Figure 17B:
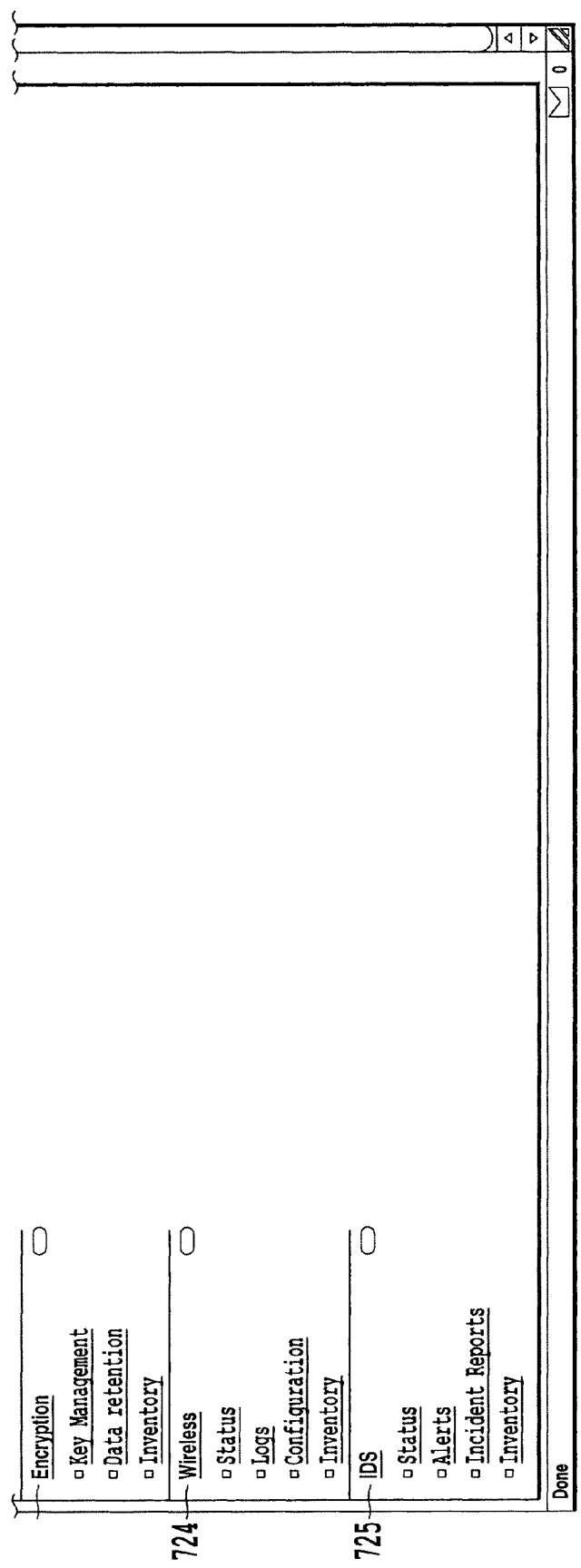

FIGS. 17A-B show exemplary information regarding a number of network intrusion events detected over a period of time for a selected store, as provided in the network-wide view 720.

Figure 18:
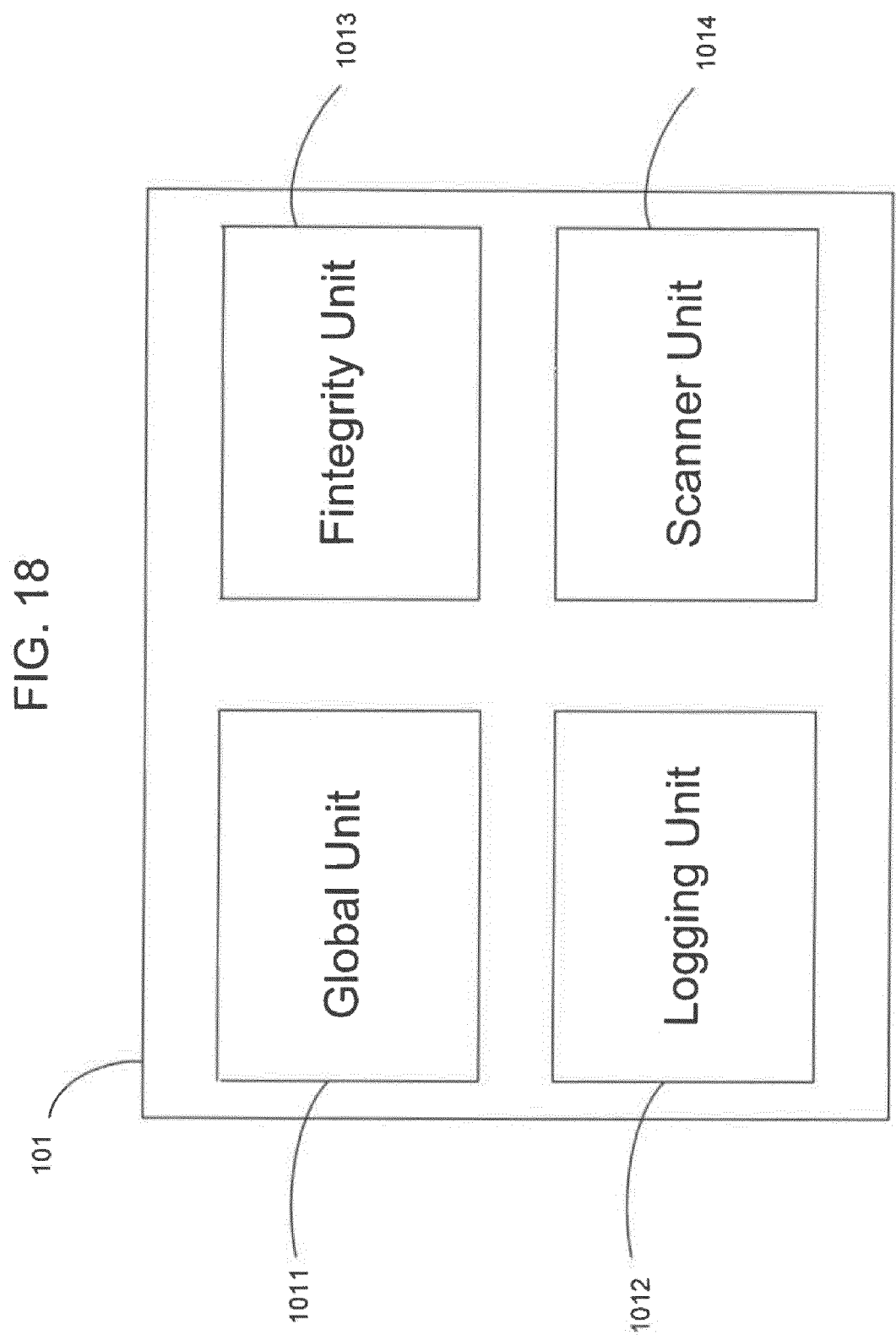
FIG. 18 is a symbolic diagram of a Redbox according to an embodiment of the invention.

FIG. 18 is a symbolic representation of the various components of the Redbox 101 according to an embodiment of the invention. The Redbox includes at least a global unit 1011, a logging unit 1012, an fintegrity unit 1013, and a scanner unit 1014.

Redbox Base Configuration

This section provides an overview of Redbox configuration and a description of how the system enforces basic controls such as process isolation, virtualized networking and role-based access controls (RBAC). Redbox virtualization and security may, for example, be based on the OpenSolaris™ operating system.

Redbox Units

The Redbox uses containers as a means of providing process isolation to meet a PCI requirement of ensuring that there is one primary function per server. Different functions such logging, firewalls, scanning, and file integrity monitoring run in different units of the Redbox 101. These containers are an implementation of operating system-level virtualization technology.

A container is the combination of system resource controls and the boundary separation provided by units. The units act as completely isolated virtual servers within a single operating system instance. By consolidating multiple sets of application services onto one system and by placing each unit into isolated virtual server containers, system administrators can reduce cost and provide all the same protections of separate machines on a single machine.

There is always one unit defined, named the "global" unit 1011. The units hosted by a global units are known as "non-global units" but are sometimes just called "units." The global units encompasses all processes running on the system, whether or not these processes are running within a non-global units.

Each unit has its own node name, virtual network interfaces, and storage assigned to it; there is no requirement for a units to have any minimum amount of dedicated hardware other than the disk storage necessary for its unique configuration. Specifically, it does not require a dedicated CPU, memory, physical network interface or HBA, although any of these can be allocated specifically to one a unit.

Each unit has a security boundary surrounding the unit which prevents a process associated with one unit from interacting with or observing processes in other unit. Each unit can be configured with its own separate user list. The system automatically manages user ID conflicts, for two units on a system that have the same user ID 10000 defined, by, for example, mapping to the system's own unique global identifier.

In an exemplary aspect, each Redbox may include the following units:

a global unit 1011—This is the "master" unit that runs the core OS and is the controller for the non-global units listed below, a logging unit 1012—This unit is the log host for all network devices at a particular location (Windows POS machines, other Redbox units, wireless access point, etc.), an fintegrity unit 1013—This is the unit which runs FTIMES, which is a file integrity monitor against the POS and other CDE systems involved in card data processing, and a scanner unit 1014—This unit includes the NESSUS security scanner which performs regularly scheduled network scans to ensure that all devices on the network are properly secured and that no new "rogue" devices have been put onto the network.

Each unit has its own unique IP address and its own set of users that may connect to it.

In another exemplary configuration of the Redbox, the Redbox may not include the global unit 1011, but all described functionalities of the Redbox are preserved. Further, in another exemplary configuration of the Redbox, the Redbox may include a 3G Wireless unit for detection of wireless signals and for wireless 3G backup services.

Network Virtualization

In addition to communicating over physical network interfaces, the units can communicate via a virtualized LAN that is entirely contained within the physical hardware of a Redbox 101. To do this, the Redbox 101 may leverage network virtualization and resource control which is a set of features that provides an internal network virtualization and quality of service.

The Redbox leverages network virtualization technology to provide a means of privileged communication between different units. For example, if the Redbox firewall needs to provide logs to the logging zone, it can provide them through a Virtual NIC onto a Virtualized network stack versus sending this data out over a physical network interface.

Major features of Redbox network virtualization include: Virtual NIC (VNIC) pseudo-network interface technology, and bandwidth management and flow control on a per interface and per VNIC basis ( ).

Features of Network Virtualization (VNIC)

A VNIC is a pseudo network interface that is configured on top of a system's physical Network adapter, also called a network interface (NIC). A physical interface can have more than one VNIC. Each VNIC operates like and appears to the system as a physical NIC. The individual VNIC is assigned a media access control address (MAC address), which can be configured to a value other than the default MAC address assigned to the physical NIC.

When the first VNIC is created on a system, a virtual switch is also created above the physical interface. Though not directly accessible to the user, the virtual switch provides connectivity between all VNICs configured on the same physical interface, enabling the virtual network in a box scenario. The virtual switch forwards packets between the system's VNICs. Thus, packets from an internal VNIC source never have to pass to the external network to reach an internal network destination An exclusive IP unit is a separate instance of a full TCP/IP stack, which functions on each unit. Each exclusive IP unit is built upon a physical network interface and has its own IP-related state. An exclusive IP unit can have its own routing table and routing protocols separate from the global unit on a system.

As discussed above, each unit is configured with a unique IP address. By default the global unit has a x.x.x.1 IP address, the logging unit has a x.x.x.2 IP address, the fintegrity unit has a x.x.x.3 IP address, and the scanner unit has a x.x.x.4 IP address. If the IP of vnic19 in the global unit is 10.132.150.1/24, then the logging unit would be 10.132.150.2/24, the fintegrity unit would be 10.132.150.3/24, and the scanner unit would be 10.132.150.4/24.

The units communicate as if they were unique machines with unique IP addresses on a typical LAN. Each unit has it's own unique MAC address associated with the vnic interface within that unit.

Services on Ports of Redbox Units

In an exemplary aspect, all the deployed Redboxes are hardened to minimize the potential for security vulnerabilities. Each Redbox may, for example, include the following as listening ports (on a per unit basis). Additionally access controls to each service are enforced by a stateful firewall running on each Redbox.

Global Unit
TCP Port-SSH
UDP port-SYSLOG-NG
Logging Unit
TCP port-SSH
TCP port-SYSLOG-NG
UDP port-SYSLOG-NG
Fintegrity Unit
TCP port-SSH
UDP port-SYSLOG-NG
Scanner Unit
TCP port-SSH
TCP port-NESSUSSD
UDP port-SYSLOG-NG
Local User Accounts In conventional systems, the root user (also referred to as superuser) is all-powerful, with the ability to read and write to any file, run all programs, and send kill signals to any process. For systems like the Redbox, this superuser capability violates the doctrine of least privilege, a critical component of PCI.

The Redbox's Role-based access control (RBAC) is an alternative to the all-or-nothing superuser model. RBAC uses the security principle of least privilege, which is that no user should be given more privilege than necessary for performing his or her job. RBAC allows an organization to separate superuser's capabilities and assign them to special user accounts that are called roles. Roles can be assigned to specific individuals, according to their job needs.

On the Redbox, roles are used to enforce separation of duties, particularly for operationally exclusive privileges such as firewall administration and log system operation. When a user logs onto a Redbox, that account is automatically associated with a set of roles that the user then assumes.

Under normal operation, user accounts are authenticated against a central repository (OpenLDAP) database and these accounts and role mappings are defined.

Due to operational requirements, local accounts are required for emergency purposes (i.e., when VPN tunnel is down or connectivity is lost). Below is a description of local accounts in each Redbox unit.

GLOBAL UNIT

The system may be made further secure by only allowing the following accounts to perform an interactive login: (i.e. have a valid shell and can be access from the console): root, NAGIOS, ADMIN, WBVSERVICE, PUPPET.

SCANNER UNIT
Interactive users: root, SNORT, NESSUS, NAGIOS
FINTEGRITY UNIT
Interactive users: root, FTIMES, NESSUS
LOGGING UNIT
Interactive users: root, NESSUS, NAGIOS Redbox Configuration Management A well defined and highly consistent configuration is applied to Redboxes deployed in the field. Integrity of the configuration is monitored via FTIMES and is managed from a central portal using a program, such as an open source program called PUPPET™. PUPPET™ is based on RUBY™. The PUPPET™ server has a pseudo scripting language which enables you to perform remote system administration commands, such as (but not limited to) adding and removing users, adding and removing software packages, adding or removing files on the file system, and running scripts locally on the Redbox 101.

The PUPPET™ server or "master" 907 may be located at the corporate headquarters 900 to maintain the Redbox baseline configuration. When the configuration is updated with, for instance, new firewall rules, the PUPPET server notes the change and begins the process of updating Redboxes 101 in the field and the changes "propagate" to the remote locations. Propagation of a change may occur when Redboxes check the PUPPET™ master for new updates which occurs periodically, generally every 30 minutes.

Description of PUPPET

PUPPET™ enables central management of every important aspect of the Redbox system using a cross-platform specification language that manages all the separate elements normally aggregated in different files, like users, cron jobs, and hosts, along with obviously discrete elements like packages, services, and files. PUPPET's simple declarative specification language provides powerful classing abilities for drawing out the similarities between hosts while allowing them to be as specific as necessary, and it handles dependency and prerequisite relationships between objects clearly and explicitly. PUPPET may be written entirely in RUBY.

PUPPET Security and Access Controls

Because PUPPET has administrative management rights across all Redboxes on the network, security (and in particular the processes of authentication and authorization) is critical. PUPPET may use standard SSL™ certificates for client and master verification. This means that a client verifies that it's talking with the right master and the master verifies that it's talking with the right client. Because of the cost of buying signed certificates for every client and the complexity of managing your own certificate authority (CA), PUPPET includes its own CA. It allows users to generate certificates, revoke them, sign them, remove them and list pending signature requests.

PUPPET also uses SSL™ to provide encrypted administrative access between the client and master. Certificates are the primary method of authentication between a PUPPET client and server, for example, if a client's certificate can be verified using standard SSL verification mechanisms, then it is considered authenticated. Client validation the master in the same way. In a Redbox implementation, separate certificates are required when implementing the VPN and authenticating the PUPPET client and master. This increases the level of security associated with the solution and significantly limits the possibility of man-in-the-middle attacks associated with the interception of any single set of certificates.

Redbox Deployment

Deployment and management are amongst the most important elements of a store's total cost of ownership. The Redbox not only saves hardware and software cost over traditional security solutions, but also reduces the cost of store deployment and ongoing management. As part of the effort to drive down the cost of PCI compliance, Applicant has pioneered a lower-cost deployment model that involves testing in pilot locations, automated builds of Redbox configurations and a remote-hands deployment and system management model.

Automated Redbox Build Process: The build process for Redboxes has been automated and a database of each individual Redbox configuration is maintained. With this approach, Redboxes may be built in batches far more efficiently than the traditional method of manually configuring and integrating different types of hardware. Prior to deployment, configurations are shipped to the store site where they are often installed on a "plug and play" basis.

Redboxes are built by a 'build server' on an isolated network segment. On this network, a basic build image is deployed to bare metal Redboxes using a jumpstart build server. The mechanics of the jumpstart build process may include plugging systems into the network and obtaining an IP, downloading a boot image via tftp, mounting the build image from the jumpstart server over the file system and custom partitioning scripts run to format and partition the disks, downloading and installing base build images, and running post configuration scripts to configure systems for specific stores.

Redboxes may be built in a build environment on an isolated network segment. Systems are booted after which point they connect to a boot image. Once the boot image is loaded, the operating system install image flash archive is mounted over the network and custom scripts are run which configure and install the base system. After the systems are imaged, and configured, the Redboxes can be shipped to their specific store locations, plugged in and powered up. The configured system then establishes a VPN connection back to the VPN concentrator 907, and any additional configuration takes place via PUPPET.

Certificate Generation and Storage

Certificates are generated on a processor like Sun T1000 and securely copied to the build server where they are distributed to each Redbox via the configuration scripts.

Description of the Redbox Configuration File

A master configuration file includes information about store specific configuration. This file is stored on the build server and includes fields that are populated in advance that include specific device configurations per store.

Redbox Deployment: A remote installation model has also been pioneered for the Redboxes. Redboxes arrive onsite configured for "Plug and Play" operation. Once a Redbox is connected to the store network, the Redbox can be remotely accessed for any final configuration, POS integration, testing or validation of PCI controls. In many cases, this can be done working in conjunction with a store manager or POS support vendor.

Once base image installation is complete, post install configuration scripts may be run. These scripts do a "post install" configuration which preps a Redbox for a specific location. This may be done by reading a master configuration file that maps store locations to a specific MAC address. Build server installs store specific certificates onto each Redbox during the build time.

Configurator Functions

The configurator may handle all of the specific zone and system configuration. It parses the configuration file, locates, and runs configuration scripts with logic to identify host/zone specific routing, certificate installation and user creation.

Hardware break/fix: Statistical analysis of deployments in the field indicates that Rebox hardware will fail at a rate of 2-3% per year. As such, each individual Redbox configuration is stored centrally and, in the event of a failure, a fully configured replacement unit may be built in real-time. This unit is generally shipped to the store where it follows the same plug-and-play deployment model discussed above.

"Audit Readiness" and the PCI Management Console

Under the PCI Program's Safe Harbor Provision, stores are shielded from liability only if they can demonstrate compliance with the PCIDSS at the time the breach occurred. The lack of ability to provide evidence of compliance in stores is a key concern. For this reason, one of the key overall necessities of PCI is what is termed as "audit readiness." An audit-ready environment provides ongoing (real-time) feedback on the integrity of the security controls implemented under PCI and allows authorized external and internal audiences to gauge whether the environment was in compliance on a continuous basis. Audit readiness is not focused on the information the controls provide, but rather on whether the controls are in place and demonstrably effective.

A key design objective for all controls provided under the MPS relates to "evidentiary output," or the extent to which Applicant can provide clients with evidence on the integrity of these controls. The PCI portal will provide this data to Managers and Auditors on a secure basis. Additional architectural and design details for the portal can be found in the MPS Architecture.

Retailers have faced significant challenges in cost-effectively deploying controls that satisfy PCI DSS requirements. Additionally, merchants that manage to meet these requirements across their enterprises face further challenges related to ongoing validation of their compliance programs across wide geographies. The Managed PCI System is a cost-effective and integrated alternative for implementing a PCI compliance program at the store systems level. The solution is finely tuned to meet PCI compliance requirements in store systems and provides a cost-effective platform for Network Segmentation, Network-based Intrusion Detection, POS System Integrity Monitoring, Log Aggregation, Vulnerability Management, and Wireless Access Point Detection. Additionally, the solution provides back-end automation to minimize requirements for expensive deployment and maintenance tasks.

The Managed PCI System maintains systems in an "audit-ready" state, meaning that compliance validation exercises, such as audits, can be conducted inexpensively from a secure centralized portal vs. expensive store visits. This provides both a significantly lower total cost of ownership, when compared to traditional solutions, and allows retailers to gain "safe harbor" status which provides significant benefits and relief from many liabilities in the event of a data compromise.

System Hardening

The following basic hardening may been done to make the infrastructure including the Redbox, Portal server, and VPN servers more robust. All Solaris and OpenSolaris hosts may be made more robust by implementing specific measures such as disabling all unnecessary services, employing strong and non-vulnerable services and processes, changing all default passwords, removing unnecessary or unused service and/or default accounts, implementing complex passwords, with password rotation, inactivity time-out, and lock-out rules, implementing least privilege for existing user and service accounts, and maintaining a single common account. This single common account has least privilege and is only provided when no other access is available.

Manager's PC and Bastion Windows Host

All processors and hosts, including the manager's PC (121) and bastion access host server (907) may be made more robust as per a user's requirements.

Antivirus Protection

Antivirus solutions may be deployed on all hosts (Solaris and Windows) within a network environment.

Redbox, VPN Servers, and Portal Servers

All Solaris and OpenSolaris hosts may run for example, ClamAV version 0.95. This is an Open Source antivirus and anti-malware solution. Full system scans and signature updates run once per day.

Manager's PC and Bastion Host Access Server

All processors and hosts including the manager's PC (121) and bastion host servers (907) may run, for example, Symantec Endpoint Security version 11.0. This enterprise edition includes full antivirus, malware, spyware, and antiphishing functionality.

Patch Management

Software updates and the application of operating systems and application patches are handled in a managed and centralized fashion for the Redboxes and the MPS infrastructure.

Redbox, VPN, and Portal Servers

Patch management for systems are handled differently depending on whether a small patch or hotfix is required versus a larger major upgrade that may be hundreds of megabytes in size.

In an exemplary aspect, to meet PCI requirements related to patch managements for systems running, for example, OpenSolaris™, a corresponding patch functionality is bundled into the core distribution. As releases are put out roughly every two weeks, new patches are added based on security needs or functionality requirements. Patches for these systems may also be downloaded from the Sun patch web site. Alternatively, if its a patch to a non-core part of the operating system (i.e. NESSUS™, SYSLOG-NG™, etc.) is required, then the patch could be downloaded from the main website for that application. These sites may be checked periodically to identify new patches and guidance may be provided to clients as to criticality of the patch. Because of the host's base system hardening, generally only essential services should be running and patches are rarely required.

Prior to updating, patches may be verified against those posted by the software vendor. Additionally the PUPPET™ client and server checksums as part of the process associated with pushing down new patches. All updates or changes in software may be tested on a host in a lab environment to ensure that there is no loss of functionality or configuration changes needed for the software to perform the same tasks. Testing may not be considered complete until a NESSUS scan is run against the outer host.

Once testing is complete, PUPPET™ is used to push out the new package to all the hosts in the field. Each host has a PUPPET™ client. Essentially a file would be created on the PUPPET™ server that would tell the PUPPET™ clients about the new version of the software. A PUPPET™ client checks into the server periodically, roughly every 30 minutes, and would see a script and a new package. The PUPPET™ client would then execute the script and upgrade the software or install a new package based on whatever method was chosen for the particular piece of software being upgraded.

A major upgrade is considered an upgrade of the core operating system from one version to a higher one. Major version upgrades are extremely rare and may never occur during the useful life of a host. However, Applicant has developed a plan for such major upgrades should they be required and the Solaris Live Upgrade™ may be used for this purpose. Solaris Live Upgrade significantly reduces the downtime associated with an operating system upgrade or maintenance. It enables the Solaris operating systems to continue running while administration, maintenance or software upgrades occur on a duplicate boot environment. When complete, the system simply reboots to run the updated operating environment.

In order to upgrade a host from the current version of OpenSolaris™ to a higher one, it is desirable first update the Live Upgrade tools for the newer version on the host. This is done via PUPPET™ per the procedure above. Next a special Live Upgrade boot environment for the existing software version is created which provides a reference and provides a fallback position in the event that the upgrade fails for some reason. Then a boot environment for the upgraded version using free partitions on the host's hard drive is created. There are two partitions left free specifically for the purpose of running Live Upgrade on the host—/luroot and /luvar.

Applicant provides a simple Live Upgrade script to perform the upgrade process. New packages and the script can be provided over the network via a remote share or locally attached CDROM or ISO image. Once the newer boot environment receives the set of new packages required for the upgrade a script will edit/etc/vfstab file to adjust accordingly for the new partitions. The script then reboots the host into to the new boot environment.

Manager's Workstation

Updates on managers' workstations 121 and/or POS systems may be handled via Microsoft Update Service. Available upgrades and hotfixes are reviewed and applied individually.

Remote Access

Tightly controlled remote access into the network environment is implemented.

Retail Store Network

Remote access to the restaurant network is only available via one of two means:

Manager's PC

The Manager's PC may run a program like pcAnywhere™. This may be the only access method available for these workstations. pcAnywhere access may only be available from one of the servers 907. pcAnywhere encryption is set to 256 AES symmetric encryption.

All access to the Bastion Host 907 may be implemented through a Windows Remote Desktop. This system could be a Windows 2003 Server, and domain user account are required for access. Accounts are individualized for all staff and two factor authentication is required via a solution called Phone-Factor™.

Redbox, VPN Servers, and Portal Server

Access to the Redboxes may only be available via SSH. Access may only occur over the VPN and not from the public Internet. Access to the VPN servers and Portal server may only be done via SSH also. Individual accounts are maintained via a central LDAP repository.

Obviously, numerous modifications and variations of the present invention are possible in light of the above teachings. It is therefore to be understood that within the scope of the appended claims, the invention may be practiced otherwise than as specifically described herein.

What is claimed is:

1. A system to ensure compliance with data security standards for merchants that store, process, and transmit secure data, comprising:
    a security appliance located at a merchant's site, the merchant's site having a plurality of network devices, the security appliance identifying each network device from the plurality of network devices as being included in one of a first zone containing cardholder data and a second zone not containing cardholder data, the security appliance performing multiple security functions, the security appliance including:
        a global unit to monitor the functions of the security appliance and other units of the security appliance;
        a logging unit to log data from at least each network device included in the first zone at the merchant's site and from other units of the security appliance;
        an integrity unit to construct maps of file systems of at least each network device included in the first zone containing cardholder data and to compare the constructed maps to previously constructed maps of the file systems of at least each network device included in the first zone to detect differences between them; and
        a scanning unit to perform periodic network scans to ensure security of at least each network device included in the first zone containing cardholder data and to detect unrecognized devices on the network;
    a display unit to provide information of compliance performance of the system on a secure basis;
    a back-end unit to automate and manage compliance-related tasks and data security events and to ensure integrity of the network devices; and
    a control unit to monitor compliance performance in real-time and to implement additional procedures required based on the monitored compliance to ensure that each network device included in the first zone containing cardholder data is compliant with payment card industry data security standards regardless of the compliance of each network device included in the second zone with the payment card industry data security standards.

2. The system to ensure compliance with data security standards according to claim 1, wherein each unit of the security appliance performs only one function, and each unit of the security appliance is isolated from each other but communicates with each other securely.

3. The system to ensure compliance with data security standards according to claim 1, wherein the security appliance implements a secure VPN connection with at least the network devices included in the first zone within the merchant's site, and another secure VPN connection with the back-end unit located remotely from the merchant's site.

4. The system to ensure compliance with data security standards according to claim 3, wherein a secure VPN connection requires mutual authentication by devices participating in the secure VPN connection.

5. The system to ensure compliance with data security standards according to claim 1, wherein the integrity unit issues an alert when a difference is detected during the comparing of the constructed maps to previously constructed maps.

6. The system to ensure compliance with data security standards according to claim 1, wherein the back-end unit constructs maps of file systems of the security appliance and compares the constructed maps of the file systems of the security appliance to previously constructed maps of the file systems of the security appliance to detect changes between the constructed maps and the previously constructed maps.

7. A security appliance located at a merchant's site to perform multiple security functions, the merchant's site having a plurality of network devices, the security appliance configured to identify each network device from the plurality of network devices as being included in one of a first zone containing cardholder data and a second zone not containing cardholder data, the security appliance comprising:
    a global unit to monitor the functions of the security appliance and other units of the security appliance;
    a logging unit to log data from at least each network device included in the first zone at the merchant's site and from other units of the security appliance;
    an integrity unit to construct maps of file systems of at least each network device included in the first zone and to compare the constructed maps to previously constructed maps of the files systems of at least each network device included in the first zone to detect differences between them; and
    a scanning unit to perform periodic network scans to ensure security of at least each network device included in the first zone and to detect unrecognized devices on the network, wherein
    the security functions performed by the security appliance ensure that each network device located in the first zone containing cardholder data is compliant with payment card industry data security standards regardless of the compliance of each network device included in the second zone with the payment card industry data security standards.

8. The security appliance according to claim 7, wherein each unit of the security appliance performs only one function, and each unit of the security appliance is isolated from each other but communicates with each other securely.

9. The security appliance according to claim 7, wherein the security appliance implements a secure VPN connection with at least each network device included in the first zone within a merchant's site, and implements another secure VPN connection with a back-end unit located remotely from the merchant's site.

10. The security appliance according to claim 9, wherein a secure VPN connection requires mutual authentication by devices participating in the secure VPN connection.

11. The security appliance according to claim 7, wherein the integrity unit issues an alert when a difference is detected during the comparing of the constructed maps to previously constructed maps.

12. The security appliance according to claim 9, wherein the back-end unit constructs maps of file systems of the security appliance and compares the constructed maps of the file systems of the security appliance to previously constructed maps of the file systems of the security appliance to detect changes between the constructed maps and the previously constructed maps.

13. A method to be performed by a system to ensure compliance with payment card industry data security standards for merchants that store, process, and transmit secure data, the method comprising:
performing, in a security appliance located at a merchant's site, multiple security functions, the performing including
identifying each network device from the plurality of network devices as being included in one of a first zone containing cardholder data and a second zone not containing cardholder data;
monitoring, in a global unit, functions of the security appliance and of other units of the security appliance;
logging data, in a logging unit, from at least each network device at the merchant's site and from other units of the security appliance;
constructing maps, in an integrity unit, of file systems of at least each network device included in the first zone and comparing the constructed maps to previously constructed maps of at least network device included in the first zone to detect differences between them; and
performing periodic network scans, in a scanning unit, to ensure security of at least each network device included in the first zone and to detect unrecognized devices on the network;
providing information, through a display unit, of compliance performance of the system on a secure basis;
automating and managing, in a back-end unit, compliance-related tasks and data security events and ensuring integrity of the network devices; and
monitoring, in a control unit, compliance performance in real-time and implementing additional procedures required based on the monitored performance to ensure that each network device located in the first zone containing cardholder data is compliant with the payment card industry data security standards regardless of the compliance of each network device included in the second zone with the payment card industry data security standards.

14. The method according to claim 13, further comprising:
implementing a secure VPN connection with network devices within the merchant's site, and implementing another secure VPN connection with a back-end unit located remotely from the merchant's site.

15. The method according to claim 14, wherein implementing a secure VPN connection includes mutually authenticating devices participating in the secure VPN connection.

16. The method according to claim 13, further comprising:
issuing an alert, in the integrity unit, when a difference is detected during the comparing of the constructed maps to previously constructed maps.

17. The method according to claim 13, further comprising:
constructing maps, in the back-end unit, of file systems of the security appliance and comparing the constructed maps of the file systems of the security appliance to previously constructed maps of the file systems of the security appliance to detect changes between the constructed maps and the previously constructed maps of the security appliance.

18. A system to ensure compliance with data security standards for merchants that store, process, and transmit secure data, comprising:
a security appliance located at a merchant's site, the merchant's site having a plurality of network devices, the security appliance identifying each network device from the plurality of network devices as being included in one of a first zone containing confidential user data and a second zone not containing confidential user data, the security appliance performing multiple security functions, the security appliance including:
a global unit to monitor the functions of the security appliance and other units of the security appliance;
a logging unit to log data from at least each network device included in the first zone at the merchant's site and from other units of the security appliance;
an integrity unit to construct maps of file systems of at least each network device included in the first zone containing cardholder data and to compare the constructed maps to previously constructed maps of the file systems of at least each network device included in the first zone to detect differences between them; and
a scanning unit to perform periodic network scans to ensure security of at least each network device included in the first zone containing cardholder data and to detect unrecognized devices on the network;
a display unit to provide information of compliance performance of the system on a secure basis;
a back-end unit to automate and manage compliance-related tasks and data security events and to ensure integrity of the network devices; and
a control unit to monitor compliance performance in real-time and to implement additional procedures required based on the monitored compliance to ensure that each network device included in the first zone containing the confidential user data is compliant with data security standards regardless of the compliance of each network device included in the second zone with the data security standards.

* * * * *